United States Patent
Harima et al.

(12)
(10) Patent No.: US 6,378,298 B2
(45) Date of Patent: Apr. 30, 2002

(54) EXHAUST PURIFYING APPARATUS AND METHOD FOR INTERNAL COMBUSTION ENGINE

(75) Inventors: Kenji Harima, Susono; Takaaki Itou, Mishima; Hiroki Ichinose, Fujinomiya; Kenji Katoh, Sunto-gun; Hiroshi Tanaka, Susono; Keiji Itou, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/759,316

(22) Filed: Jan. 16, 2001

(30) Foreign Application Priority Data

Feb. 3, 2000 (JP) ........................................ 2000-026281

(51) Int. Cl.[7] ............................................... F01N 3/00
(52) U.S. Cl. ........................... 60/288; 60/274; 60/286; 60/324; 60/298
(58) Field of Search ........................ 60/274, 285, 286, 60/277, 288, 298, 299, 320, 324

(56) References Cited

U.S. PATENT DOCUMENTS

| | | | | |
|---|---|---|---|---|
| 4,625,511 A | * | 12/1986 | Scheitlin et al. | 60/299 |
| 5,613,359 A | * | 3/1997 | Zahn et al. | 60/288 |
| 5,855,113 A | * | 1/1999 | Cullen et al. | 60/274 |
| 5,934,071 A | * | 8/1999 | Schatz | 60/288 |
| 5,979,159 A | | 11/1999 | Adamczyk et al. | 60/274 |
| 6,003,310 A | * | 12/1999 | Mayer et al. | 60/288 |
| 6,141,961 A | * | 11/2000 | Rinckel | 60/288 |
| 6,233,927 B1 | * | 5/2001 | Hirota et al. | 60/288 |

FOREIGN PATENT DOCUMENTS

| | | | |
|---|---|---|---|
| DE | 4218834 | * | 12/1993 |
| JP | 61-200316 | * | 9/1986 |
| JP | U 61-202619 | | 12/1986 |
| JP | A 08-105318 | | 4/1996 |
| JP | B2 2605556 | | 2/1997 |
| JP | A 10-274035 | | 10/1998 |
| JP | A 11-93653 | | 4/1999 |
| JP | A 11-153025 | | 6/1999 |

* cited by examiner

Primary Examiner—Thomas Denion
Assistant Examiner—Tu M. Nguyen
(74) Attorney, Agent, or Firm—Oliff & Berridge, PLC

(57) ABSTRACT

An exhaust purifying apparatus for an internal combustion engine includes a catalyst that purifies exhaust gas from the engine, a first passage that allows exhaust gas to flow from the engine to the catalyst, and a second passage that allows exhaust gas to flow from the engine to the catalyst. The first passage includes an accelerated cooling portion whose cross section is designed so that a relatively large quantity of heat is released from the exhaust gas in the first passage, and the second passage has a cross section designed so that a relatively small quantity of heat is released from the exhaust gas in the second passage. The apparatus further includes a flow amount controller that controls amounts of exhaust gas flowing through the first and second passages, such that the amount of exhaust gas flow through the first passage is made larger than that through the second passage when the temperature of exhaust gas emitted from the engine is to be lowered by a relatively large degree before reaching the catalyst, and such that the amount of exhaust gas flow through the second passage is made larger than that through the first passage when the temperature of exhaust gas emitted from the engine is to be lowered by a relatively small degree before reaching the catalyst.

31 Claims, 14 Drawing Sheets

EXHAUST PURIFYING APPARATUS AND METHOD FOR INTERNAL COMBUSTION ENGINE

INCORPORATION BY REFERENCE

The disclosure of Japanese Patent Application No. 2000-026281 filed on Feb. 3, 2000 including the specification, drawings and abstract is incorporated herein by reference in its entirety.

BACKGROUND OF THE INVENTION

1. Field of the Invention

The invention relates to an exhaust purifying apparatus and method for purifying exhaust gas discharged from an internal combustion engine through the use of a catalytic converter.

2. Description of Related Art

As a measure for reducing the amount of harmful components of exhaust gas discharged from an internal combustion engine into the atmosphere, an exhaust system is known which purifies the exhaust gas of the harmful components by using the oxidizing or reducing effect of a catalyst.

In general, this type of catalyst has an activation temperature range, and is not able to substantially remove harmful components in exhaust gas when the catalyst midbed temperature is outside the activation temperature range. This type of catalyst also has a temperature characteristic that its exhaust purifying capability considerably varies in accordance with the catalyst midbed temperature even within the activation temperature range.

The temperature of a catalyst disposed in an exhaust passage of the engine significantly depends on the temperature of exhaust gas flowing through the catalyst. Since the exhaust gas temperature changes considerably in accordance with the operating state of the internal combustion engine, the catalyst midbed temperature also changes depending on the operating state of the engine.

Therefore, if measures are not taken to control the catalyst midbed temperature, the exhaust purifying capability of the catalyst changes from moment to moment and does not stabilize, which may undesirably result in fluctuations in the concentrations of harmful components in exhaust gas escaping into the atmosphere.

In exhaust purifying systems using catalysts, it is particularly important to determine how to keep the catalyst midbed temperature within the activation temperature range and, furthermore, how to stabilize the catalyst midbed temperature within a temperature range in which the exhaust purifying capability is high, in order to improve exhaust purifying performance.

Furthermore, the catalyst is likely to undergo heat deterioration when exposed to high temperatures. It is therefore desirable to prevent inadvertent flow of high-temperature exhaust gas to the catalyst.

Typical fuels for internal combustion engines contain sulfur. When such a fuel is burned, sulfur contained in the fuel is caused to burn and produce oxides of sulfur (SOx), such as $SO_2$ and $SO_3$, which become exhaust gas components. When the exhaust gas containing SOx reaches the catalyst, SOx is apt to be absorbed into the catalyst and form sulfates, and the like. Since the sulfates are stable, the sulfates are unlikely to be decomposed and released, and tend to be accumulated in the catalyst. If the amount of SOx accumulated in the catalyst increases, the ability of the catalyst to reduce other harmful components (HC, CO, NOx) in exhaust gas may deteriorate. This is generally called "S-poisoning".

In order to maintain a high exhaust purifying capability of the catalyst for a long time, therefore, it is necessary to recover the catalyst from S-poisoning by decomposing SOx accumulated in the catalyst and releasing decomposed SOx from the catalyst. This S-poisoning recovery process requires the catalyst to be placed in a high-temperature atmosphere having a certain temperature or higher. In this case, too, appropriate control of the catalyst midbed temperature is very important in order to efficiently recover the catalyst from S-poisoning.

Japanese Patent Laid-Open Publication No. 8-105318 discloses a technology relating to catalyst temperature control performed at the time of the aforementioned S-poisoning recovery process. In an exhaust purifying apparatus disclosed in this publication, an exhaust manifold of an engine capable of operation in a lean-burn mode and a catalyst capable of substantially removing NOx in exhaust gas discharged from the engine (a generally termed lean-burn NOx catalyst) are connected by a first exhaust passage and by a second exhaust passage that are disposed in parallel with each other.

In this apparatus, the channel length of the first exhaust passage is set to be greater than the channel length of the second exhaust passage. With this arrangement, the temperature of exhaust gas flowing through the first exhaust passage decreases by a larger extent than that of exhaust gas flowing through the second exhaust passage. In other words, a greater exhaust gas cooling effect can be achieved by heat dissipation from the first exhaust passage than from the second exhaust passage.

Furthermore, a control valve is mounted in the second exhaust passage in such a manner that exhaust gas is caused to flow through the first exhaust passage while the control valve is closed, and that exhaust gas is caused to flow through the second exhaust passage while the control valve is opened.

When the S-poisoning recovery process is performed on the catalyst, the catalyst midbed temperature needs to be kept high. Therefore, the control valve is placed in an open position so that exhaust gas flows through the second exhaust passage, which has a shorter channel length, and is less likely to cool exhaust gas. When the S-poisoning recovery process is not performed, the control valve is placed in a closed position so that exhaust gas flows through the first exhaust passage, which has a greater channel length, and is more likely to cool exhaust gas.

In the above-described known catalyst temperature control system, however, the first exhaust passage and the second exhaust passage must be formed with largely different channel lengths in order to provide significantly different exhaust-gas cooling effects. As a result, the channel length of the first exhaust passage becomes very long, and a catalyst temperature control unit becomes large in size, thus causing a problem in installing the control system on the vehicle.

SUMMARY OF THE INVENTION

It is therefore an object of the invention to provide an exhaust purifying apparatus that is simple and compact in construction, wherein the catalyst midbed temperature can be suitably controlled.

To accomplish the above and/or other objects, one aspect of the invention provides an exhaust purifying apparatus for an internal combustion engine having a catalyst, a first passage, a second passage and a flow amount controller. The catalyst purifies exhaust gas emitted from the internal combustion engine. The first passage is disposed between the engine and the catalyst to allow exhaust gas to flow therethrough from the engine to the catalyst. The first passage includes an accelerated cooling portion whose cross section is designed so that a first quantity of heat is released from the exhaust gas in the first passage. The second passage is disposed between the engine and the catalyst to allow exhaust gas to flow therethrough from the engine to the catalyst. The second passage has a cross section that is designed so that a second quantity of heat that is smaller than the first quantity of heat is released from the exhaust gas in the second passage. The flow amount controller controls amounts of exhaust gas flowing through the first passage and the second passage, such that: (i) the amount of exhaust gas flowing through the first passage is made larger than that flowing through the second passage when the temperature of exhaust gas emitted from the engine is to be lowered by a relatively large degree before the exhaust gas flows into the catalyst; and (ii) the amount of exhaust gas flowing through the second passage is made larger than that flowing through the first passage when the temperature of exhaust gas emitted from the engine is to be lowered by a relatively small degree before the exhaust gas flows into the catalyst. By controlling the amounts of exhaust gas flowing through the first passage and through the second passage in this manner, the midbed temperature of the catalyst can be controlled to be within a suitable range.

In the exhaust purifying apparatus as described above, the flow amount controller may consist of a flow amount control valve. Such a flow amount control valve may be of the electromagnetically driven type, or of the hydraulically driven type.

In the apparatus of the invention, "(i) the amount of exhaust gas flowing through the first passage is made larger than that flowing through the second passage" includes the case where the entire amount of exhaust gas is caused to flow through the first passage while no exhaust gas is caused to flow through the second passage. Likewise, "(ii) the amount of exhaust gas flowing through the second passage is made larger than that flowing through the first passage" includes the case where the entire amount of exhaust gas is caused to flow through the second passage while no exhaust gas is caused to flow through the first passage.

In one preferred embodiment of the invention, the accelerated cooling portion of the first passage has a generally arcuate shape in cross section, and the second passage has a generally circular shape in cross section. It is, however, to be understood that the cross-sectional shape of the first passage is not limited to the generally arcuate shape, but may be selected from other shapes including a generally U-like shape, a rectangular shape with one side eliminated, and a polygonal shape having a plurality of segments connected in a non-linear manner. The first passage may be provided with radiating fins formed on the outer wall surface thereof, so as to permit a relatively large quantity of heat to be released from exhaust gas passing through the first passage.

In another preferred embodiment of the invention, the accelerated cooling portion of the first passage substantially surrounds the second passage. With this arrangement, the exhaust purifying apparatus can be made compact or small in size, and can be more easily installed on the vehicle.

Preferably, the first passage and the second passage have substantially equal lengths. The resulting exhaust purifying apparatus can be made compact, which is advantageous in installation of the apparatus in the vehicle.

Preferably, the first passage and the second passage have cross-sectional areas that are substantially equal. The exhaust purifying apparatus having this feature does not suffer from a difference in the exhaust resistance between the first passage and the second passage.

In the exhaust purifying apparatus as described above, the catalyst may be a lean NOx catalyst capable of purifying exhaust gas with a lean air-fuel ratio of NOx. The lean NOx catalyst may be an occlusion-reduction type NOx catalyst that absorbs NOx when incoming exhaust gas has a lean air-fuel ratio, and releases and reduces the absorbed NOx into $N_2$ when the concentration of oxygen contained in the incoming exhaust gas is reduced, or may be a selective reduction type NOx catalyst that reduces or decomposes NOx in the presence of hydrocarbon in an oxygen-excess atmosphere. It is, however, to be understood that the catalyst is not limited to the lean NOx catalyst, but may be a three-way catalyst.

In the exhaust purifying apparatus as described above, the flow amount controller controls the amounts of exhaust gas flowing through the first passage and through the second passage, based on a catalyst midbed temperature of the catalyst or a parameter effecting the catalyst midbed temperature. In this manner, the catalyst midbed temperature can be controlled with improved accuracy. Here, the parameter effecting the catalyst midbed temperature may be, for example, an exhaust gas temperature, or an operating state of the engine. The exhaust gas temperature can be used as the parameter since the catalyst midbed temperature greatly depends upon the exhaust gas temperature. The operating state of the engine can be used as the parameter since the temperature of exhaust gas discharged from the engine can be estimated according to the operating state of the engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Referring to FIGS. 1 to 17, preferred embodiments of an exhaust purifying apparatus for an internal combustion engine of the invention will be described in detail. In each of the following embodiments, the engine exhaust purifying apparatus of the invention is employed in a vehicular direct injection type lean-burn gasoline engine capable of lean combustion.

Referring first to FIGS. 1 to 11, an exhaust purifying apparatus for an internal combustion engine according to a first embodiment of the invention will be described. Initially, the construction of the engine exhaust purifying apparatus according to the first embodiment will be described with reference to FIGS. 1 to 4.

Figure 1:
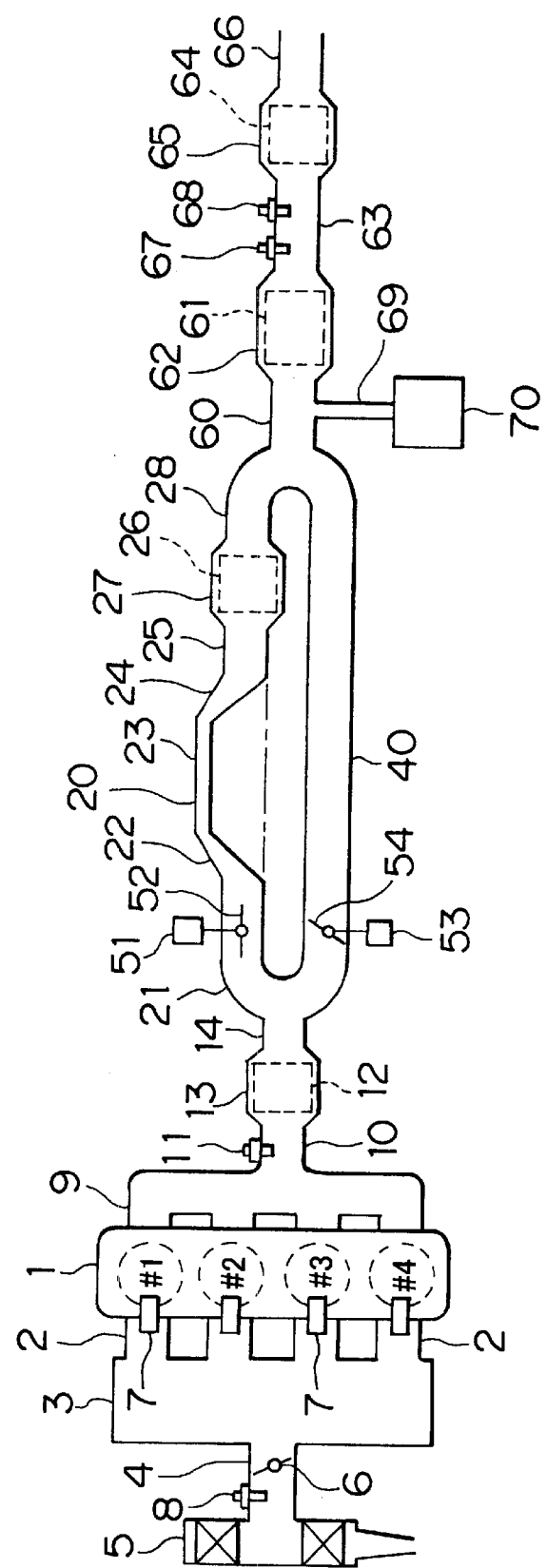
FIG. 1 is a schematic diagram illustrating the construction of a first embodiment of the invention in the form of an exhaust purifying apparatus for an internal combustion engine.
Figure 2:
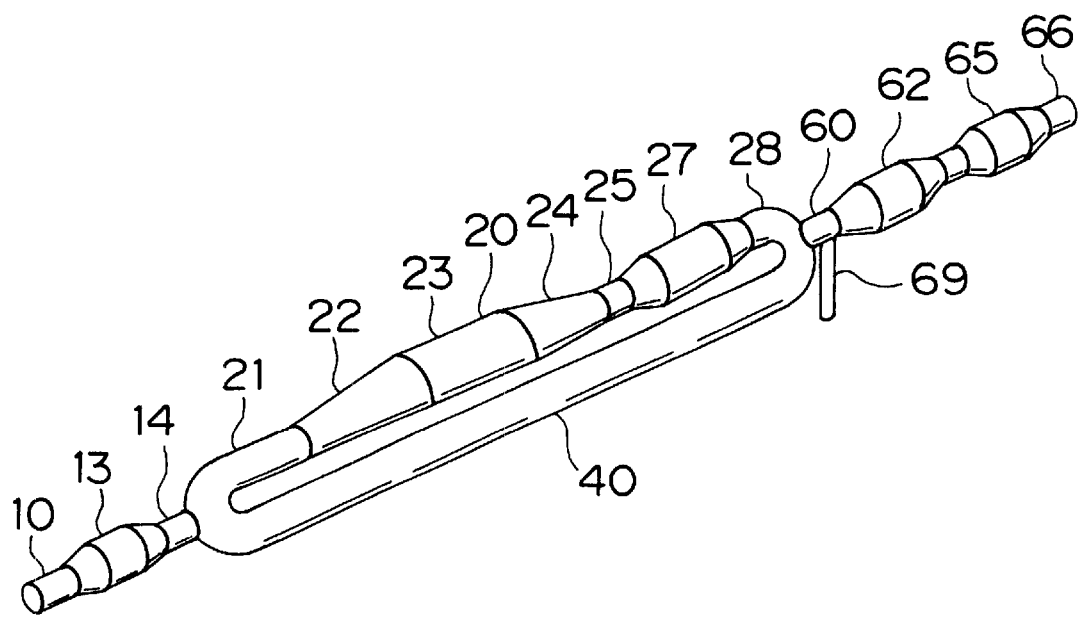
FIG. 2 is a perspective view of a principal portion of the exhaust purifying apparatus of the first embodiment.

An engine body 1 of the first embodiment shown in FIG. 1 is a main body of an in-line four-cylinder engine. Intake ports of the cylinders of the engine body 1 are connected to a surge tank 3 via corresponding intake branch pipes 2. The surge tank 3 is connected to an air cleaner 5 via an intake pipe 4. A throttle valve 6 is provided within the intake pipe 4. An air flow meter 8 that is disposed upstream of the throttle valve 6 is adapted to output an electric signal corresponding to the amount of air flowing in the intake pipe 4. Furthermore, the cylinders are provided with fuel injection valves 7 that inject fuel directly into the cylinders. The fuel injection valves 7 and an ECU 90 as described later constitute an exhaust air-fuel ratio control unit.

Exhaust ports of the respective cylinders of the engine body 1 are connected to an exhaust pipe 10 via an exhaust manifold 9, so that the exhaust gases flowing from these cylinders meet or combine in the exhaust pipe 10. The exhaust pipe 10 is provided with an upstream-side O$_2$ sensor 11 that outputs an electric signal corresponding to the oxygen concentration of exhaust gas flowing in the exhaust pipe 10.

The exhaust pipe 10 is connected to a casing 13 that houses a catalyst 12 for cold start. The cold-start catalyst 12 is a catalyst for substantially purifying exhaust gas upon a start of the engine at which a NOx catalyst 61 as described later has not been activated. For example, the cold-start catalyst 12 consists of a two-way catalyst formed by loading an alumina support with a precious metal such as platinum Pt.

The casing 13 is connected to a first passage 20 and to a second passage 40 via an exhaust pipe 14. The first passage 20 and the second passage 40 have substantially equal lengths, and are disposed in parallel with each other.

Figure 3:
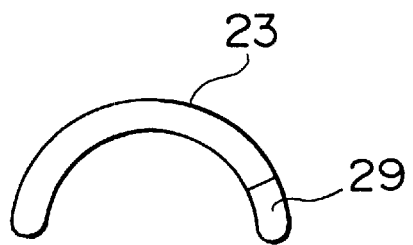
FIG. 3 is a vertical cross-sectional view of an accelerated cooling portion of the exhaust purifying apparatus of the first embodiment.

The first passage 20 includes a tubular portion 21 having a cylindrical shape (with a circular cross section) which is connected to the exhaust pipe 14. The tubular portion 21 is connected to an accelerated cooling portion 23 that has a generally arcuate cross-sectional shape as shown in FIG. 3, with a sectional-shape changing portion 22 interposed therebetween. Furthermore, the accelerated cooling portion 23 is connected to a tubular portion 25 having a cylindrical shape, with a sectional-shape changing portion 24 interposed therebetween. The tubular portion 25 is connected to a casing 27 that houses an HC adsorbent 26. The casing 27 is connected to a tubular portion 28 having a cylindrical shape.

The accelerated cooling portion 23 is formed with a generally arcuate shape in cross section to provide increased heat dissipation, so as to cause the temperature of exhaust gas flowing in the first passage 20 to fall or decrease at a relatively high rate. A cross-sectional shape and dimensions of the accelerated cooling portion 23 and a length of this cooling portion 23 in an axial direction thereof (i.e., the length as measured in the direction of flow of exhaust gas) are set so as to achieve a desired heat dissipation effect.

As shown in FIG. 3, an interfering plate 29 is provided in one of opposite arc end portions of the accelerated cooling portion 23, for averaging different flow rates of exhaust gas flowing in the accelerated cooling portion 23, which flow rates are distributed along the arc of the cooling portion 23. Thus, the accelerated cooling portion 23 achieves efficient heat dissipation by averaging the flow rates of the exhaust gas.

The sectional-shape changing portion 22 that extends from the tubular portion 21 with a circular cross section has a gradually varying cross-sectional shape, so as to smoothly connect the tubular portion 21 to the accelerated cooling portion 23 having an arcuate cross-sectional shape. Similarly, the sectional-shape changing portion 24 that extends from the accelerated cooling portion 23 with an arcuate cross-sectional shape has a gradually varying cross-sectional shape, so as to smoothly connect the accelerated cooling portion 23 to the tubular portion 25 with a circular cross section.

The HC adsorbent 26 is an adsorbent for adsorbing unburned HC that cannot be removed by the cold-start catalyst 12 at the time of, for example, a cold start of the engine.

A first exhaust switching valve 52 adapted to be opened and closed by a first actuator 51 is mounted in the tubular portion 21 of the first passage 20. The second passage 40, on the other hand, has a cylindrical shape over the entire length thereof, and a second exhaust switching valve 54 adapted to be opened and closed by a second actuator 53 is mounted in the second passage 40.

In this embodiment, the first exhaust switching valve 52 and the second exhaust switching valve 54 constitute a flow amount control unit (or system) that controls the amount of exhaust gas flow in the first passage 20 and the amount of exhaust gas flow in the second passage 40.

With the first passage 20 and the second passage 40 constructed as described above, if the exhaust gas of the same temperature is caused to flow through the first passage 20 and the second passage 40 at the same flow rate, the temperature of the exhaust gas decreases by a greater degree when it passes through the first passage 20 than when it passes through the second passage 40.

The tubular portion 28 of the first passage 20 and the second passage 40 are both connected to a junction pipe (junction passage) 60. The junction pipe 60 is connected to a casing 62 that houses an occlusion-reduction type NOx catalyst (hereinafter, simply referred to as "NOx catalyst") 61, as one type of lean-burn NOx catalyst. The casing 62 is connected to a casing 65 that houses a three-way catalyst 64, via an exhaust pipe 63. Furthermore, the casing 65 is connected to a muffler (not shown) via an exhaust pipe 66.

The NOx catalyst 61 is formed by, for example, loading an alumina support with a precious metal, such as platinum Pt, palladium Pd, rhodium Rh, or iridium Ir, and at least one substance selected from alkali metals, such as potassium K, sodium Na, lithium Li, and cesium Cs, alkaline earths, such as barium Ba and calcium Ca, and rare earths, such as lanthanum La and yttrium Y.

The NOx catalyst 61 performs NOx absorbing and releasing operations; the NOx catalyst 61 absorbs NOx when the exhaust air-fuel ratio is on a fuel-lean side, and releases the thus absorbed NOx when the oxygen concentration in the incoming exhaust gas is reduced. NOx released from the NOx catalyst 61 is reduced into $N_2$ by a reducing agent. Here, the exhaust air-fuel ratio refers to the ratio of the total amount of the air to the total amount of fuel and the total amount of the reducing agent supplied into the engine intake passage and a portion of the exhaust passage upstream of the NOx catalyst 61. When neither fuel (hydrocarbon) nor air is supplied into the exhaust passage upstream of the NOx catalyst 61, the exhaust air-fuel ratio equals the ratio of the total amount of air to the total amount of fuel supplied into the cylinders.

In the exhaust pipe 63 are mounted an exhaust temperature sensor (temperature detector) 67 that outputs an electric signal proportional to the temperature of exhaust gas flowing in the exhaust pipe 63, and a downstream-side $O_2$ sensor 68 that outputs an electric signal corresponding to the oxygen concentration of the exhaust gas flowing in the exhaust pipe 63.

In this embodiment, the exhaust gas temperature detected by the exhaust temperature sensor 67 is also used to represent the catalyst midbed temperature of the NOx catalyst 61 or the catalyst midbed temperature of the three-way catalyst 64.

A secondary air supply pipe 69 is connected to the junction pipe 60. A secondary air supplying device 70 connected to the secondary air supply pipe 69 is operable to supply secondary air into the junction pipe 60.

Figure 4:
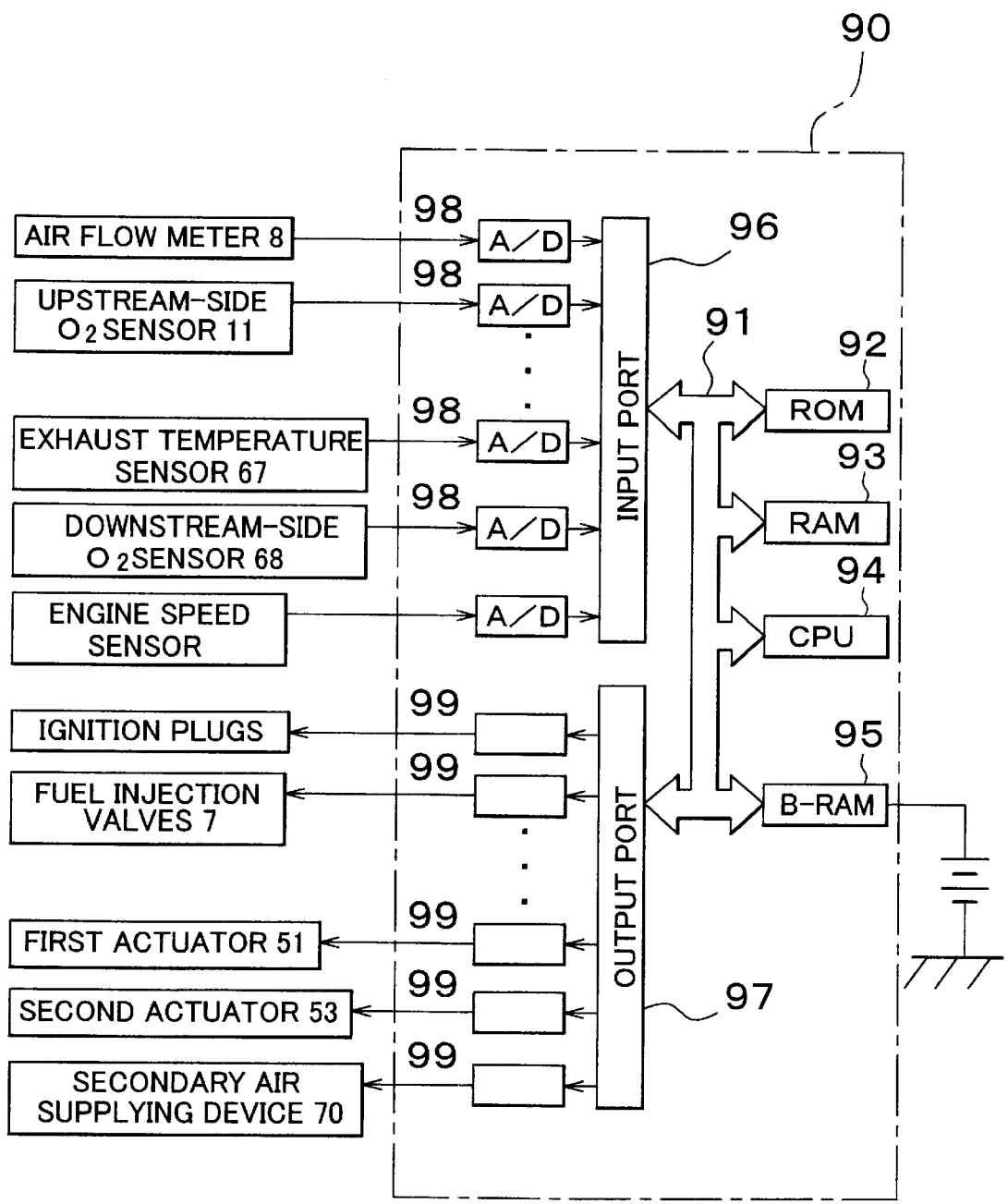
FIG. 4 is a diagram illustrating the configuration of an ECU in the first embodiment.

As shown in FIG. 4, the engine-controlling electronic control unit (ECU) 90, which is in the form of a digital computer, includes a ROM (read-only memory) 92, a RAM (random access memory) 93, a CPU (microprocessor) 94, a B-RAM (backup RAM) 95 constantly supplied with power, an input port 96, and an output port 97. These components of the ECU 90 are interconnected by a bidirectional bus 91.

Output signals of the air flow meter 8, the upstream-side $O_2$ sensor 11, the exhaust temperature sensor 67, the downstream-side $O_2$ sensor 68, etc., are received by the input port 96 of the ECU 90 via corresponding A/D converters 98. Furthermore, output pulses representing the engine speed N are transmitted from an engine speed sensor (not shown) to the input port 96 of the ECU 90.

The output port 97 of the ECU 90 is electrically connected to the fuel injection valves 7 of the cylinders, ignition plugs (not shown) of the cylinders, the first actuator 51, the second actuator 53, the secondary air supplying device 70, etc., via corresponding drive circuits 99.

In the meantime, air-fuel ratio control is performed on the engine of this embodiment by varying the air-fuel ratio depending upon the operating state of the engine. That is, if lean-burn conditions are established in the engine, the air-fuel ratio of a mixture to be burned in each cylinder is controlled to a fuel-lean side of the stoichiometric air-fuel ratio (which will be referred to as "lean control"). If the lean-burn conditions are not established, the air-fuel ratio of a mixture to be burned in each cylinder is controlled to the stoichiometric air-fuel ratio (which will be referred to as "stoichiometric control"). For example, when the engine load is higher than a set load, or when an engine warm-up operation is being performed, or when the NOx catalyst 61 is not in an activated state, it is determined that the lean-burn conditions are not established, and the stoichiometric control is performed. In other cases, it is determined that the lean-burn conditions are established, and the lean control is performed.

Since the air-fuel ratio of exhaust gas discharged from the engine during the lean control is on the fuel-lean side, NOx contained in the exhaust gas is absorbed into the NOx catalyst 61 during the lean control. However, since the NOx absorbing capability of the NOx catalyst 61 is limited, it is necessary to release NOx from the NOx catalyst 61 before the NOx absorbing capability of the NOx catalyst 61 becomes saturated. In this embodiment, therefore, when the amount of NOx absorbed in the NOx catalyst 61 exceeds a predetermined amount, the air-fuel ratio of a mixture to be burned in each cylinder is temporarily set to the fuel-rich side of the stoichiometric air-fuel ratio so as to release NOx from the NOx catalyst 61 and reduce NOx. This air-fuel ratio control is termed lean/rich spike control.

Figure 10:
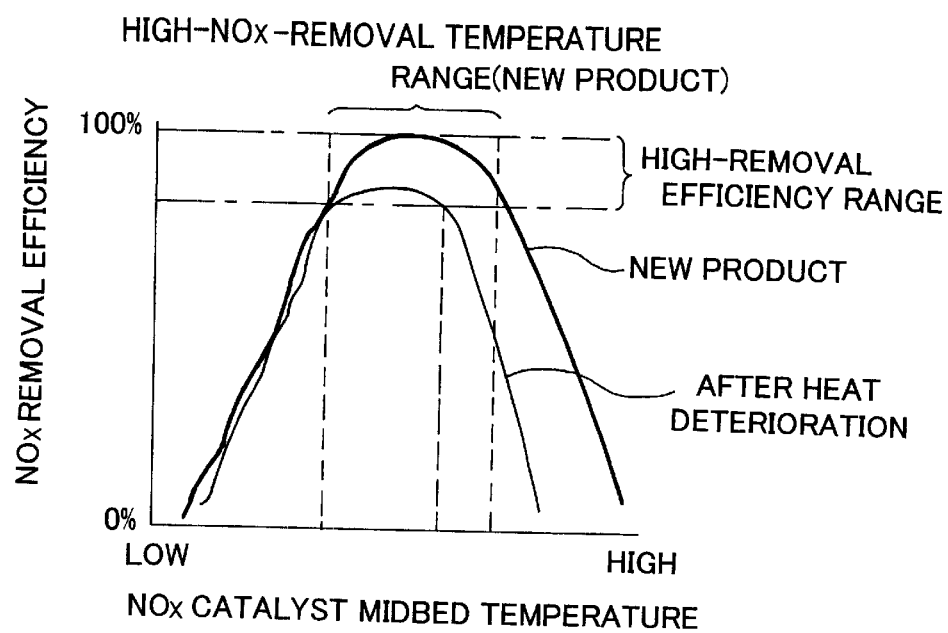
FIG. 10 is a graph indicating an example of the relationship between the midbed temperature of an occlusion-reduction type NOx catalyst and its NOx removal efficiency.

The NOx removal efficiency of the NOx catalyst 61 varies depending on the catalyst midbed temperature as indicated in FIG. 10. The NOx removal efficiency of the NOx catalyst 61 is low when the catalyst midbed temperature is excessively low or high. The NOx catalyst 61 exhibits considerably high NOx removal efficiencies within a predetermined temperature range.

In this embodiment, therefore, the first passage 20, which provides a relatively large exhaust gas temperature decrease, and the second passage 40, which provides a relatively small exhaust gas temperature decrease, are selectively used depending upon the situation, so as to keep the catalyst midbed temperature of the NOx catalyst 61 within a temperature range in which the NOx removal efficiency is high (hereinafter, referred to as "high-NOx-removal temperature range"). By controlling the catalyst midbed temperature of the NOx catalyst 61 in this manner, the NOx catalyst 61 is made less likely to be exposed to high temperatures, whereby the progress of heat deterioration of the NOx catalyst 61 can be retarded. The switching between the exhaust gas channels is carried out by using the first exhaust switching valve 52 and the second exhaust switching valve 54. The temperature control of the NOx catalyst 61 will be described in detail below.

Fuel normally contains sulfur (S). When sulfur contained in fuel is burned, oxides of sulfur (SOx), such as $SO_2$ and $SO_3$, are produced. The NOx catalyst 61 also absorbs the SOx in exhaust gas. While SOx form sulfates in the NOx catalyst 61, the sulfates thus formed are stable and less likely to be decomposed. That is, sulfates cannot be decomposed only by passing rich air-fuel ratio exhaust gas through the NOx catalyst 61, but remain in the NOx catalyst 61. As the amount of sulfates produced increases, the NOx absorbing capability of the NOx catalyst 61 is reduced. This is generally termed "S-poisoning".

However, sulfates produced in the NOx catalyst 61 can be decomposed and released from the NOx catalyst 61 in the form of $SO_3$ by controlling the air-fuel ratio of incoming exhaust gas to an air-fuel ratio that is slightly to the fuel-rich side of the stoichiometric air-fuel ratio (hereinafter, referred to as "slightly rich air-fuel ratio") when the temperature of the NOx catalyst 61 is higher than a predetermined temperature (hereinafter, referred to as "SOx releasing temperature"). In this embodiment, therefore, when the amount of SOx absorbed in the NOx catalyst 61 exceeds a predetermined prescribed amount, the air-fuel ratio of the incoming exhaust gas is controlled to a slightly rich air-fuel ratio (e.g., about 13.5 to about 14.3) and the NOx catalyst 61 is heated so that SOx is released from the NOx catalyst 61. This process will be referred to as "S-poisoning recovery process" of the NOx catalyst 61. $SO_3$ released from the NOx catalyst 61 by the S-poisoning recovery process is immediately reduced into $SO_2$ by HC and CO present in the incoming exhaust gas.

During the S-poisoning recovery process in this embodiment, secondary air is supplied to the junction pipe 60 in order to increase the temperature of the NOx catalyst 61 so that SOx is released from the NOx catalyst 61. During the S-poisoning recovery process, the engine is operated at a slightly rich air-fuel ratio, so that exhaust gas contains a large amount of unburned HC. Therefore, when secondary air is supplied into the junction pipe 60, unburned HC contained in the exhaust gas is oxidized on the NOx catalyst 61 by oxygen present in a large amount in the secondary air. Reaction heat produced by the oxidation increases the temperature of the NOx catalyst 61. Furthermore, during the S-poisoning recovery process, the exhaust gas is caused to flow through the second passage 40, so as to suppress an exhaust gas temperature decrease and thereby accelerate heating of the NOx catalyst 61.

Immediately after the S-poisoning recovery process, the catalyst midbed temperature of the NOx catalyst 61 is very high, and the NOx removal efficiency is low. Thus, after the S-poisoning recovery process is completed in this embodiment, the exhaust gas channel is switched from the second passage 40 to the first passage 20 that provides a relatively large exhaust gas temperature decrease, and secondary air is supplied to the junction pipe 60, in order to quickly cool the NOx catalyst 61 to a temperature at which the NOx removal efficiency is high. This process will be referred to as "NOx catalyst cooling process".

The S-poisoning recovery process and the NOx catalyst cooling process will be described in detail below.

When the air-fuel ratio is controlled to the stoichiometric air-fuel ratio, and when the air-fuel ratio is controlled to a slightly rich air-fuel ratio, the ECU 90 performs main feedback control of the amount of fuel injected, based on an output value of the upstream-side $O_2$ sensor 11, and also performs subsidiary feedback control of the amount of fuel injected, based on an output value of the downstream-side $O_2$ sensor 68 for further improved control performance.

The operation of the exhaust purifying apparatus for the engine according to the present embodiment will be now described with reference to the flowcharts of FIGS. 5 to 9.

Figure 5:
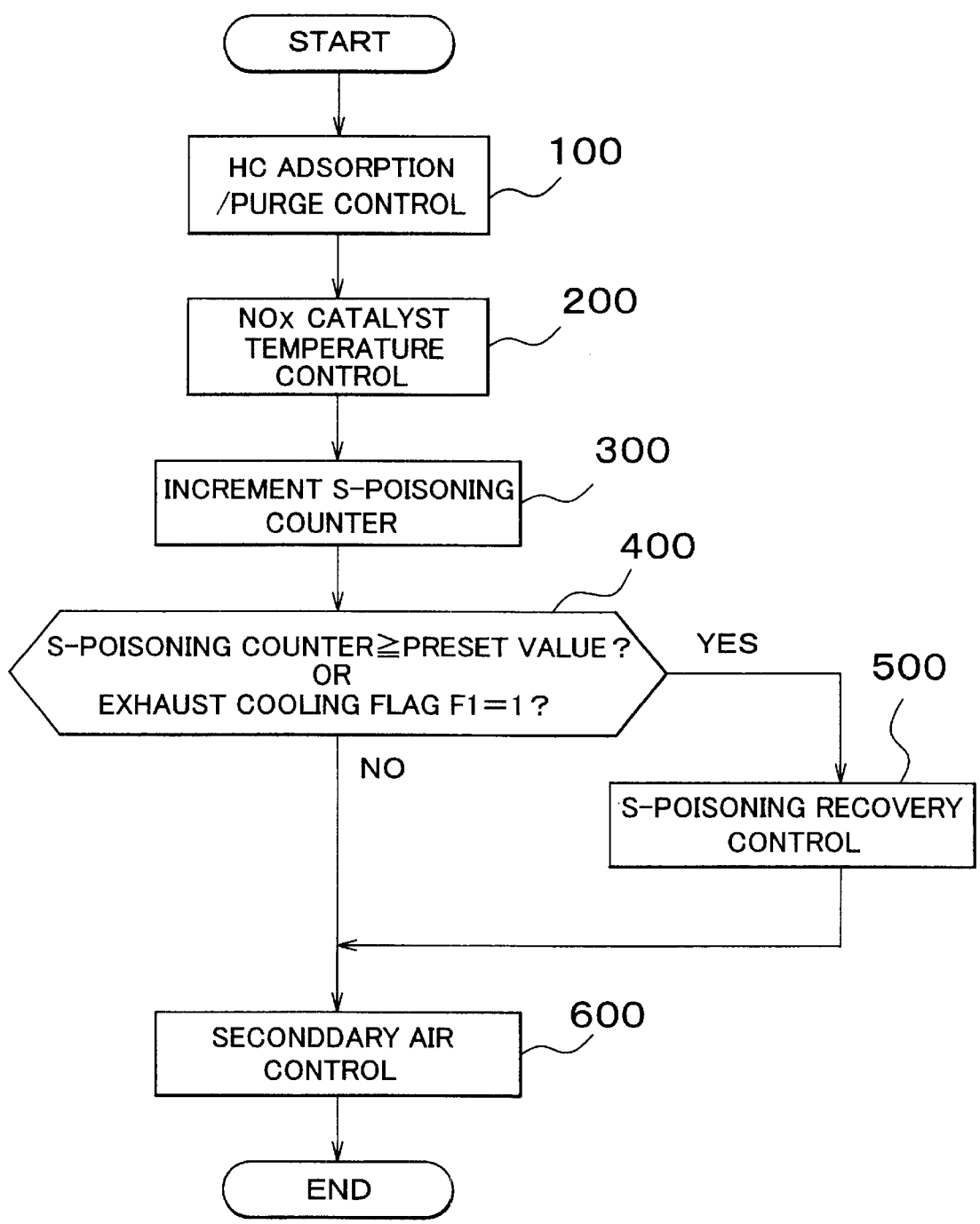
FIG. 5 is a flowchart illustrating a basic control routine to be executed in the first embodiment.

The flowchart of FIG. 5 illustrates a basic control routine of the engine exhaust purifying apparatus of this embodiment. The basic control routine is pre-stored in the ROM 92 of the ECU 90, and is repeatedly executed at certain time intervals set in advance by the CPU 94.

First, the ECU 90 executes HC adsorption/purge control in step 100. The HC adsorption/purge control is performed so as to pass exhaust gas through the first passage 20 and cause the HC adsorbent 26 to adsorb unburned HC in exhaust gas during a cold start of the engine, so that unburned HC produced in a large amount during the cold start is prevented from being released to the atmosphere. In addition, the adsorbed HC is desorbed from the HC adsorbent 26 when the engine is brought into a suitable operating state, and the HC thus desorbed is oxidized and removed by the NOx catalyst 61 or by the three-way catalyst 64 disposed downstream of the HC adsorbent 26. The HC adsorption/purge control will be described in detail below.

After executing the HC adsorption/purge control, the ECU 90 proceeds to step 200 to perform temperature control of the NOx catalyst 61. Under the NOx catalyst temperature control, the catalyst midbed temperature of the NOx catalyst 61 always remains within an optimal temperature range in which the NOx removal efficiency is high. More specifically, when the catalyst midbed temperature is about to be on the high-temperature side outside the optimal temperature range, the ECU 90 causes exhaust gas to flow through the first passage 20 so as to increase heat dissipation, so that the temperature of exhaust gas flowing into the NOx catalyst 61 is lowered and the catalyst midbed temperature of the NOx catalyst 61 is reduced. Conversely, when the catalyst midbed temperature is about to be on the low temperature side outside the optimal temperature range, the ECU 90 causes exhaust gas to flow through the second passage 40 so as to reduce heat dissipation, so that the temperature of exhaust gas flowing into the NOx catalyst 61 is raised and the catalyst midbed temperature of the NOx catalyst 61 is increased. The NOx catalyst midbed temperature control will be described in detail later.

After executing the NOx catalyst temperature control, the ECU 90 proceeds to step 300 in which the ECU 90 updates an S-poisoning counter related to the NOx catalyst 61. The S-poisoning counter functions to make up or adjust a physical quantity, such as an integrated amount of fuel consumed or an integrated amount of exhaust gas, which can be a substitute for the S consumption amount, so as to estimate the amount of S-poisoning of the NOx catalyst 61. The S-poisoning counter is reset when the S-poisoning recovery process is completed.

Subsequently, the ECU 90 proceeds to step 400 in which the ECU 90 determines whether at least one of the following conditions is met: a condition that the count value of the S-poisoning counter is equal to or larger than a preset value, and a condition that an exhaust cooling flag F1 is "1". If the count value of the S-poisoning counter is equal to or larger than the preset value, it means that the S-poisoning of the NOx catalyst 61 has progressed and it is time to execute the S-poisoning recovery process. If the exhaust cooling flag F1 is "1", it is time to supply the secondary air to the exhaust passage in order to promptly cool the NOx catalyst 61 to a temperature at which the exhaust can be purified of NOx after the S-poisoning recovery process.

If the count value of the S-poisoning counter is equal to or larger than the preset value, or if the exhaust cooling flag F1 is "1", an affirmative decision (YES) is obtained in step 400, and the ECU 90 goes to step 500 to perform an S-poisoning recovery control. In the S-poisoning recovery control, SOx absorbed in the NOx catalyst 61 is desorbed from the NOx catalyst 61 and discharged in the form of $SO_2$. In addition, the S-poisoning recovery control is performed so as to lower the catalyst midbed temperature of the NOx catalyst 61 down to a temperature at which the catalyst 61 shows a high NOx removing capability, since the NOx catalyst 61 has a high temperature and a low NOx removing capability immediately after the desorption of SOx from the catalyst 61. The S-poisoning control will be described in detail later.

If a negative decision (NO) is obtained in step 400, or after the ECU 90 executes the S-poisoning recovery control in step 500, the ECU 90 proceeds to step 600 to perform secondary air control. The secondary air control is executed to supply secondary air into the exhaust passage when necessary. After executing step 600, the ECU 90 temporarily ends execution of the routine.

Figure 6:
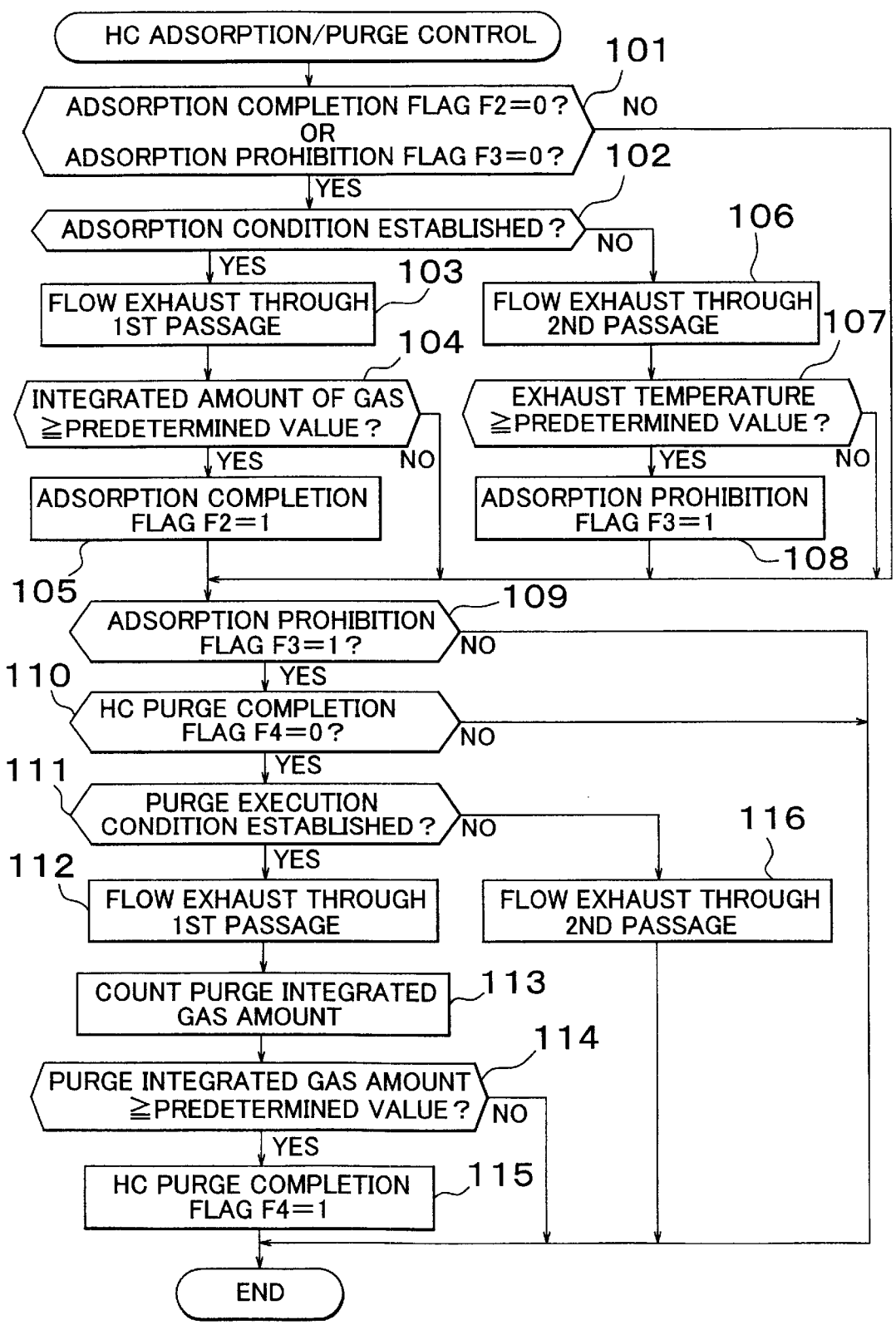
FIG. 6 is a flowchart illustrating an HC adsorption/purge control routine to be executed in the first embodiment.

Next, the HC adsorption/purge control of step 100 will be described with reference to an HC adsorption/purge control routine illustrated in FIG. 6.

First in step 101, the ECU 90 accesses a storage area of an adsorption completion flag F2 and a storage area of an adsorption prohibition flag F3 that are set in advance in predetermined areas of the RAM 93, and determines whether at least one of the following conditions is met: a condition that the adsorption completion flag F2 is "0", and a condition that the adsorption prohibition flag F3 is "0".

In the storage area of the adsorption completion flag F2, "1" is stored when a predetermined amount of HC has been adsorbed on the HC adsorbent 26 during a cold start of the engine, and the initial value "0" is stored when the engine is stopped. Thus, the initial value "0" is always stored in the storage area of the adsorption completion flag F2 every time the engine is started.

In the storage area of the adsorption prohibition flag F3, "1" is stored when the exhaust gas temperature becomes equal to or higher than a predetermined value, and the initial value "0" is stored when the engine is stopped. Thus, the initial value "0" is always stored in the storage area of the adsorption prohibition flag F3 every time the engine is started.

If the adsorption completion flag F2 is "0" or if the adsorption prohibition flag F3 is "0", the ECU 90 makes an affirmative decision in step 101, and proceeds to step 102 to determine whether an HC adsorption condition is established. The HC adsorption condition is established when the cold-start catalyst 12 has not reached the activation temperature. Whether the condition is established or not is determined based on the engine cooling water temperature, the integrated amount of exhaust gas that has been emitted since the start of the engine, or the like. Therefore, the HC adsorption condition is established when the engine is started in a cold state in which a great amount of unburned HC is produced.

If an affirmative decision (YES) is obtained in step 102, the ECU 90 proceeds to step 103 to operate the first actuator 51 so as to fully open the first exhaust switching valve 52, and operate the second actuator 53 so as to completely close the second exhaust switching valve 54, thereby causing exhaust gas to flow through the first passage 20. When the HC adsorption condition is met, the HC adsorbent 26 is at an adsorption temperature and the exhaust gas temperature is low. If exhaust gas is passed through the first passage 20, therefore, unburned HC contained in the exhaust gas is adsorbed to the HC adsorbent 26. Furthermore, since exhaust gas is cooled while passing through the accelerated cooling portion 23 of the first passage 20, the temperature of the exhaust gas flowing into the HC adsorbent 26 is lowered, with results of an increase in the HC adsorption rate of the HC adsorbent 26 and an increase in the HC adsorption time.

After executing step 103, the ECU 90 proceeds to step 104 in which the ECU 90 determines whether the integrated amount of exhaust gas after the HC adsorption condition is established is equal to or larger than a predetermined value. The predetermined value of the integrated amount of exhaust gas herein is set at an amount that is needed before the temperature of the HC adsorbent 26 becomes equal to or higher than an HC release temperature, and is empirically determined and stored in advance in the ROM 92.

If an affirmative decision (YES) is obtained in step 104, the ECU 90 proceeds to step 105 to rewrite the value in the storage area of the adsorption completion flag F2 from "0" to "1". The ECU 90 then proceeds to step 109. If a negative decision (NO) is obtained in step 104, on the other hand, the ECU 90 proceeds from step 104 to step 109. Therefore, as long as the HC adsorption condition is established, exhaust gas flows through the first passage 20 until the integrated amount of exhaust gas following the establishment of the HC adsorption condition reaches or exceeds the predetermined value, and an affirmative decision (YES) is obtained in step 104.

Conversely, if a negative decision (NO) is obtained in step 102, the ECU 90 proceeds to step 106 to operate the first actuator 51 so as to completely close the first exhaust switching valve 52, and operate the second actuator 53 so as to fully open the second exhaust switching valve 54, thereby causing exhaust gas to flow through the second passage 40.

The reason for switching the channel of exhaust gas from the first passage 20 to the second passage 40 is as follows. When the adsorption condition is not established, the cold-start catalyst 12 has reached the activation temperature so that the cold-start catalyst 12 is able to substantially remove HC from exhaust gas. Furthermore, when the adsorption condition is not established, it can be assumed that the temperature of the HC adsorbent 26 has become equal to or higher than the HC release temperature. Therefore, if the exhaust gas is caused to flow through the first passage 20 in this situation, there is a danger that HC may be released from the HC adsorbent 26 to degrade exhaust emission.

After executing step 106, the ECU 90 proceeds to step 107 to determine whether the exhaust gas temperature is equal to or higher than a predetermined temperature, based on the output value of the exhaust temperature sensor 67. In step 107, the exhaust gas temperature is used to represent the catalyst midbed temperature of the three-way catalyst 64. The exhaust gas temperature being equal to or higher than the predetermined level means that the temperature of the three-way catalyst 64 is equal to or higher than its activation temperature. The predetermined level of the exhaust gas temperature is empirically determined and stored in advance in the ROM 92.

If an affirmative decision (YES) is obtained in step 107, it is considered that the three-way catalyst 64 is activated, and therefore the ECU 90 proceeds to step 108. In step 108, the ECU 90 rewrites the value in the storage area of the adsorption prohibition flag F3 from "0" to "1". After that, the ECU 90 proceeds to step 109. Conversely, if a negative decision (NO) is obtained in step 107, the ECU 90 proceeds from step 107 to step 109.

In step 109, the ECU 90 determines whether the adsorption prohibition flag F3 is "1". If a negative decision (NO) is obtained in step 109, the ECU 90 temporarily ends execution of the routine. That is, the ECU 90 does not proceed to steps 110–115 and 116, and does not perform HC purge from the HC adsorbent 26 until the adsorption prohibition flag F3 becomes "1".

When the ECU 90 executes this routine after rewriting the adsorption completion flag F2 to "1" in step 105 and rewriting the adsorption prohibition flag F3 to "1" in step 108, a negative decision (NO) is obtained in step 101, and the ECU 90 proceeds from step 101 to step 109.

If the ECU 90 makes an affirmative decision (YES) in step 109, the ECU 90 proceeds to step 110 to access a storage area of an HC purge completion flag F4 that is set in advance in a predetermined area of the RAM 93, and determine whether "0" is stored in the storage area.

In the storage area of the HC purge completion flag F4, "1" is stored when the integrated value of the amount of exhaust gas during the HC purge from the HC adsorbent 26 becomes equal to or greater than a predetermined value, and the initial value "0" is stored when the engine is stopped. Thus, the initial value "0" is stored in the storage area of the HC purge completion flag F4 every time the engine is started.

If an affirmative decision (YES) is obtained in step 110, the ECU 90 proceeds to step 111 to determine whether an HC purge execution condition is established. The HC purge execution condition is that the catalyst midbed temperature of the three-way catalyst 64 is equal to or higher than the activation temperature AND the engine is being operated in a lean control mode or is in fuel-cut operation. This is because desorption of HC from the HC adsorbent 26 when the air-fuel ratio of exhaust gas is on the lean side results in reduced burdens on the NOx catalyst 61 and the three-way catalyst 64, thus preventing deterioration of emission. Furthermore, if the catalyst midbed temperature of the three-way catalyst 64 is lower than the activation temperature, HC purged from the HC adsorbent 26 cannot be substantially removed by the three-way catalyst 64, resulting in degraded emission. In this embodiment, the catalyst midbed temperature of the three-way catalyst 64 is represented by the exhaust gas temperature detected by the exhaust temperature sensor 67.

If an affirmative decision (YES) is obtained in step 111, namely, if the HC purge execution condition is established, the ECU 90 proceeds to step 112. In step 112, the ECU 90 operates the first actuator 51 so as to fully open the first exhaust switching valve 52, and operates the second actuator 53 so as to completely close the second exhaust switching valve 54, thereby causing exhaust gas to flow through the first passage 20.

When exhaust gas is caused to flow through the first passage 20, HC that has been adsorbed on the HC adsorbent 26 are purged since the temperature of the HC adsorbent 26 is equal to or higher than the HC release temperature. Purged HC flow together with exhaust gas through the NOx catalyst 61 and the three-way catalyst 64, and is substantially removed by oxidation at the NOx catalyst 61 or the three-way catalyst 64.

After executing step 112, the ECU 90 proceeds to step 113 to update a purge integrated gas amount counter that integrates the amount of exhaust gas during HC purge from the HC adsorbent 26 from the start of the purge, and thus integrate the amount of exhaust gas during the HC purge. The purge integrated gas amount counter is reset to initial value "0" when the engine is stopped.

After integrating the exhaust gas during HC purge in step 113, the ECU 90 proceeds to step 114 to determine whether the count value of the purge integrated gas amount counter is equal to or larger than a predetermined value, that is, whether the integrated amount of exhaust gas during HC purge is equal to or larger than a predetermined value. The predetermined value of the integrated amount of exhaust gas during HC purge is an amount of exhaust gas that is needed in order to purge the entire amount of HC adsorbed on the HC adsorbent 26, and is empirically determined and stored in advance in the ROM 92.

If a negative decision (NO) is obtained in step 114, the ECU 90 temporarily ends this routine. Therefore, exhaust gas is caused to flow through the first passage 20 and HC purge from the HC adsorbent 26 continues until the integrated amount of exhaust gas during the HC purge becomes equal to or greater than the predetermined value.

If an affirmative decision (YES) is obtained in step 114, the ECU 90 proceeds to step 115 to rewrite the value in the storage area of the HC purge completion flag F4 from "0" to "1". Subsequently, the ECU 90 temporarily ends execution of the routine.

When the ECU 90 executes the next and subsequent cycles of this routine, the ECU 90 makes a negative decision (NO) in step 110, and then temporarily ends the routine. In this case, therefore, the ECU 90 does not execute steps 111–115 and 116.

If the purge execution condition is not established or satisfied any longer during the next cycle of the routine while HC is being purged from the HC adsorbent 26, the ECU 90 makes a negative decision (NO) in step 111, and proceeds to step 116. In step 116, the ECU 90 operates the first actuator 51 so as to completely close the first exhaust switching valve 52, and operates the second actuator 53 so as to fully open the second exhaust switching valve 54, thereby causing exhaust gas to flow through the second passage 40. As a result, HC purge from the HC adsorbent 26 is temporarily stopped. The HC purge is restarted when the purge execution condition is satisfied again.

As described above, by executing the HC adsorption/purge control, unburned HC discharged upon a start of the engine, in particular, unburned HC discharged in a large amount during a cold start of the engine, is prevented from being discharged into the atmosphere.

Figure 7:
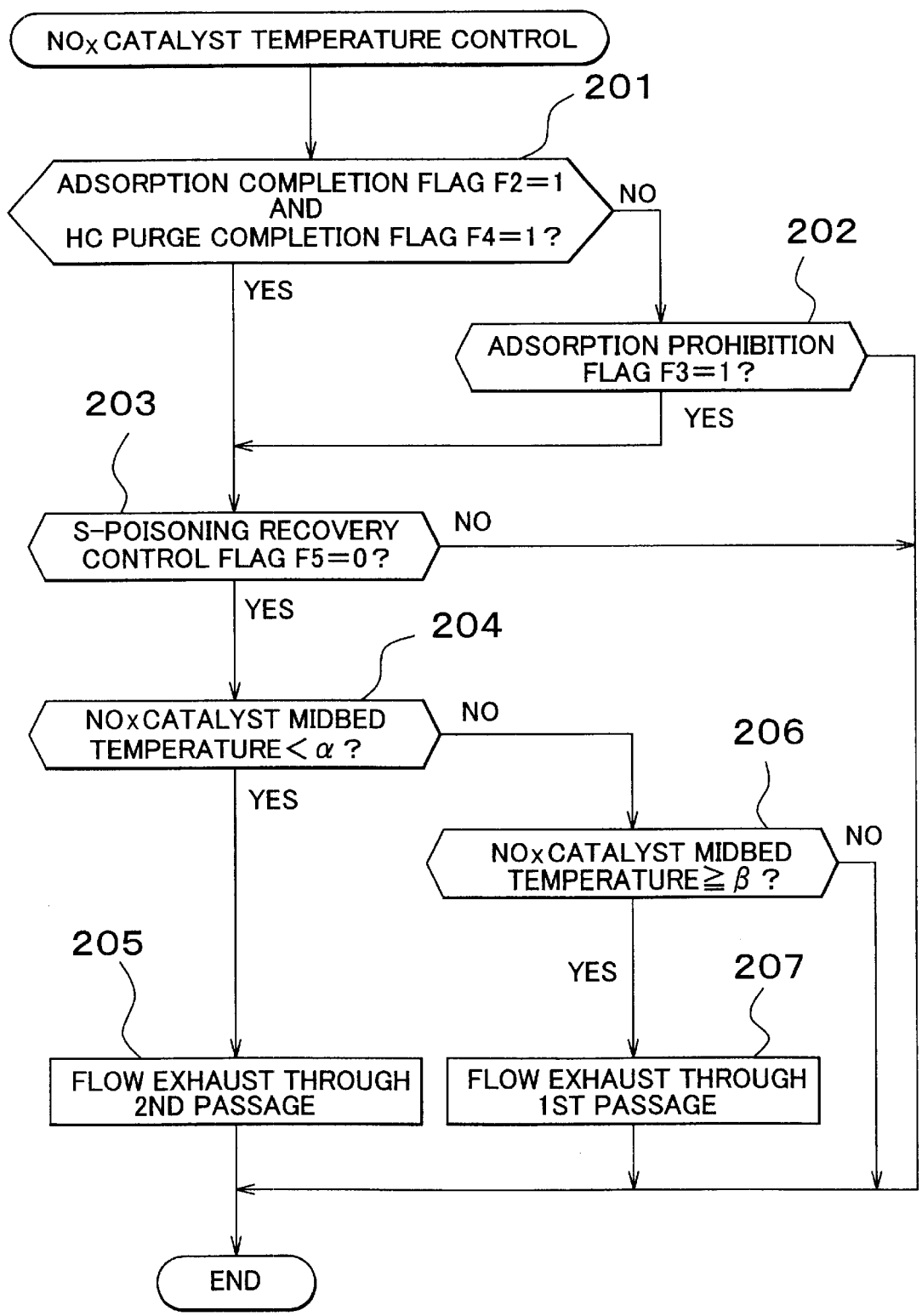
FIG. 7 is a flowchart illustrating a NOx catalyst temperature control routine to be executed in the first embodiment.

Next, the NOx catalyst temperature control of step 200 in the basic control routine in FIG. 5 will be described with reference to a NOx catalyst temperature control routine illustrated in FIG. 7.

First in step 201, the ECU 90 determines whether both the adsorption completion flag F2 and the HC purge completion flag F4 are "1". If a negative decision (NO) is obtained in step 201, the ECU 90 proceeds to step 202. If an affirmative decision (YES) is obtained in step 201, the ECU 90 proceeds to step 203.

In step 202, the ECU 90 determines whether the adsorption prohibition flag F3 is "1". If an affirmative decision (YES) is obtained in step 202, the ECU 90 proceeds to step 203. If a negative decision (NO) is obtained in step 202, the ECU 90 temporarily ends execution of this routine. Thus, the ECU 90 does not proceed to step 203 unless purge of HC adsorbed to the HC adsorbent 26 is completed or the three-way catalyst 64 has been activated.

In step 203, the ECU 90 accesses a storage area of an S-poisoning recovery control flag F5, and determines whether "0" is stored therein. In the storage area of the S-poisoning recovery control flag F5, "1" is stored when the S-poisoning recovery process of desorbing SOx absorbed in the NOx catalyst 61 is being executed, and "0" is stored when the NOx catalyst cooling process is being executed after the S-poisoning recovery process has been completed.

If a negative decision is obtained in step 203, that is, if the S-poisoning recovery process is being performed on the NOx catalyst 61, the ECU 90 temporarily ends execution of the routine.

If an affirmative decision (YES) is obtained in step 203, the ECU 90 proceeds to step 204 to determine whether the catalyst midbed temperature of the NOx catalyst 61 is lower than a specified value α. In this embodiment, the exhaust gas temperature detected by the exhaust temperature sensor 67 represents the catalyst midbed temperature of the NOx catalyst 61.

If the ECU 90 makes an affirmative decision (YES) in step 204, the ECU 90 proceeds to step 205. In step 205, the ECU 90 operates the first actuator 51 so as to completely close the first exhaust switching valve 52, and operates the second actuator 53 so as to fully open the second exhaust switching valve 54, thereby causing exhaust gas to flow through the second passage 40. As described above, the temperature of exhaust gas flowing through the second passage 40 decreases by a smaller degree than that of exhaust gas flowing through the first passage 20. Therefore, the temperature of exhaust gas flowing into the NOx catalyst 61 can be increased. As a result, the catalyst midbed temperature of the NOx catalyst 61 can be kept within a temperature range in which a high NOx removal efficiency is achieved.

If a negative decision (NO) is obtained in step 204, the ECU 90 proceeds to step 206 in which the ECU 90 determines whether the catalyst midbed temperature of the NOx catalyst 61 is equal to or higher than a specified value β. The specified value β is higher than the above-indicated specified value α(β>α).

If an affirmative decision (YES) is obtained in step 206, the ECU 90 proceeds to step 207. In step 207, the ECU 90 operates the first actuator 51 so as to fully open the first exhaust switching valve 52, and operates the second actuator 53 so as to completely close the second exhaust switching valve 54, thereby causing exhaust gas to flow through the first passage 20. The temperature of the exhaust gas flowing through the first passage 20 decreases by a greater degree than that of exhaust gas flowing through the second passage 40. Thus, the temperature of exhaust gas flowing into the NOx catalyst 61 is lowered, so that the catalyst midbed temperature of the NOx catalyst 61 can be kept within a temperature range in which a high NOx removal efficiency is achieved.

If a negative decision (NO) is obtained in step 206, the ECU 90 temporarily ends execution of the routine. Therefore, when the catalyst midbed temperature of the NOx catalyst 61 is equal to or greater than the specified value α but is less than the specified value β, the current exhaust gas channel continues to be used without being switched to the other channel, thus reducing the frequency of switching between the exhaust gas channels.

The specified value α, which serves as a threshold for the exhaust gas channel switching, is a minimum temperature at which the NOx removal efficiency can be kept high. The specified value β is a maximum temperature at which the NOx removal efficiency can be kept high. The specified values α, β may be simply fixed values, or may be changed as follows: since the temperature characteristic of the NOx removal efficiency varies depending on the degree of heat deterioration of the NOx catalyst, the degree of heat deterioration of the NOx catalyst may be detected, and the specified values α, β may be changed in accordance with the detected degree of heat deterioration.

Figure 11:
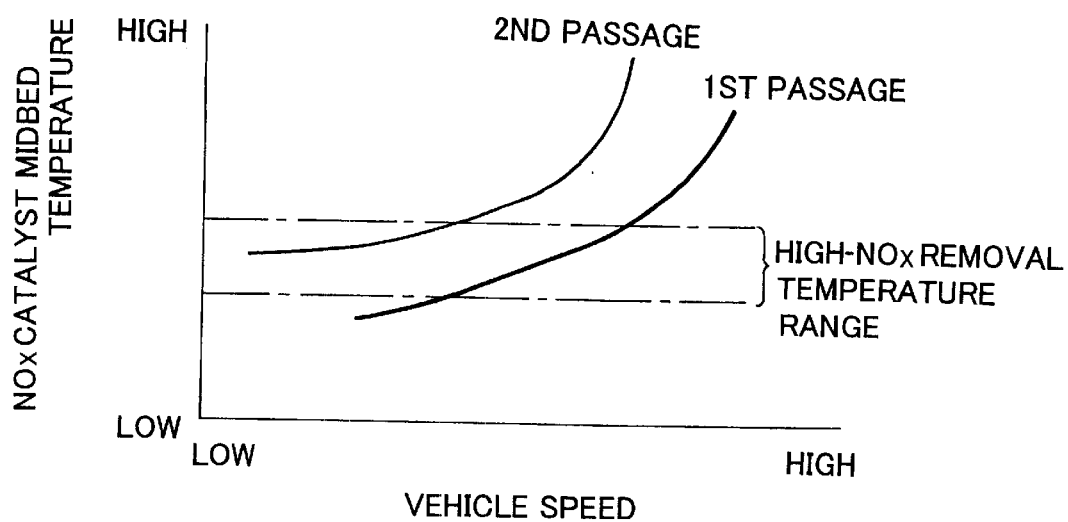
FIG. 11 is a graph indicating a relationship between the vehicle speed and the catalyst midbed temperature measured when exhaust gas is caused to flow through only one of a first passage and a second passage.

FIG. 11 indicates an empirically obtained example of the relationship between the vehicle speed and the catalyst midbed temperature of the NOx catalyst 61 when exhaust gas is caused to flow through the first passage 20 or the catalyst midbed temperature of the NOx catalyst 61 when exhaust gas is caused to flow through the second passage 40. As indicated in FIG. 11, when exhaust gas is passed through the first passage 20, the NOx catalyst 61 cannot be kept within a high-NOx removal temperature region if the vehicle speed is low. When exhaust gas is passed through the second passage 40, the NOx catalyst 61 cannot be kept within the high-NOx removal temperature region if the vehicle speed is high. If the exhaust gas channel is switched between the first passage 20 or the second passage 40 in accordance with the catalyst midbed temperature of the NOx catalyst 61 as described above, it becomes possible to keep the catalyst midbed temperature of the NOx catalyst 61 within the high-NOx removal temperature region over a broad vehicle-speed range from a low vehicle speed to a high vehicle speed.

Figure 8:
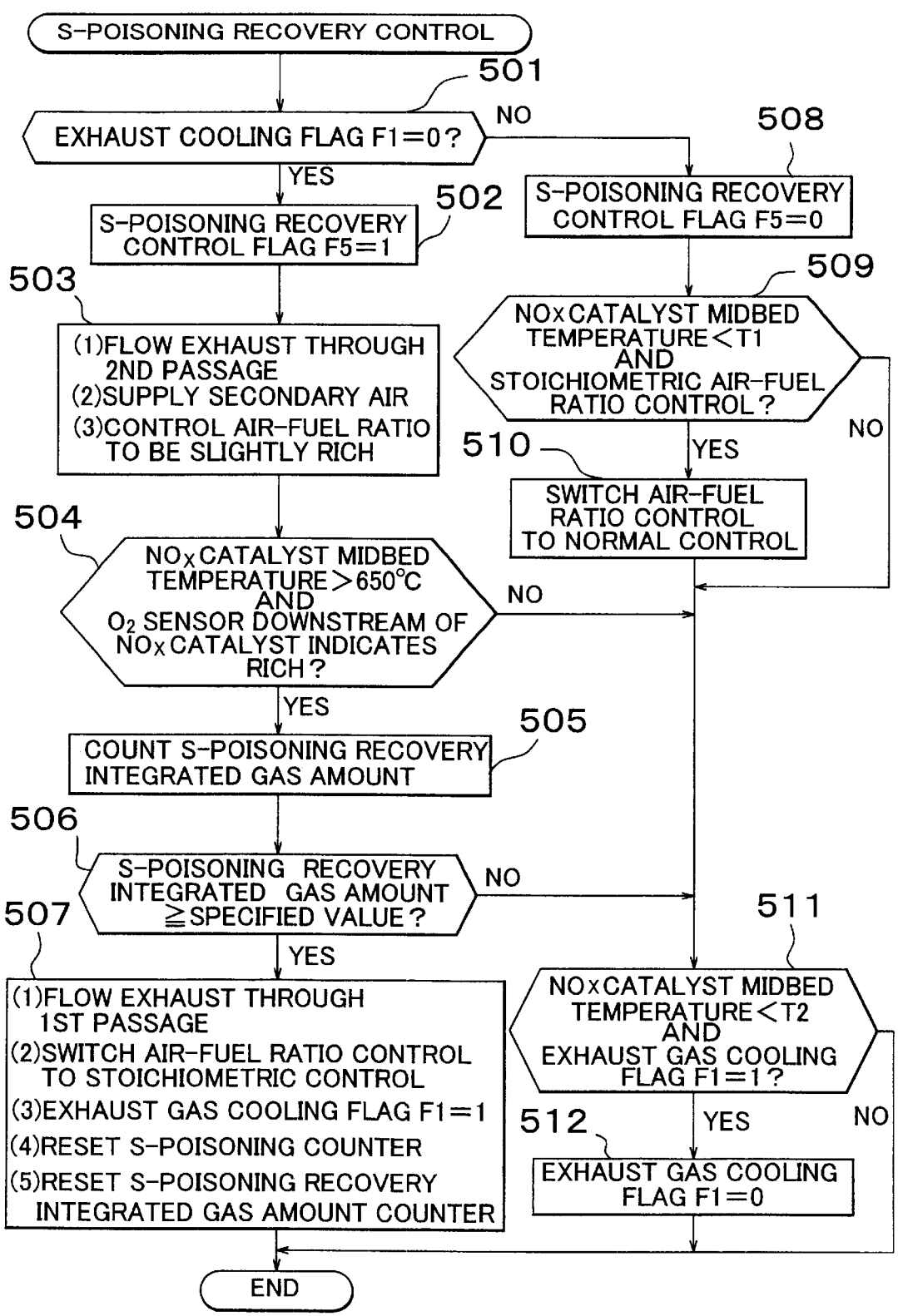
FIG. 8 is a flowchart illustrating an S-poisoning recovery control routine to be executed in the first embodiment.

Next, the S-poisoning recovery control of step 500 in the basic control routine of FIG. 5 will be described with reference to an S-poisoning recovery control routine as illustrated in FIG. 8.

First in step 501, the ECU 90 determines whether the exhaust cooling flag F1 is "0".

If an affirmative decision (YES) is obtained in step 501, it means that the count value of the above-indicated S-poisoning counter is equal to or greater than a predetermined value. In this case, the ECU 90 proceeds to step 502 in which the ECU 90 sets the S-poisoning recovery control flag F5 to "1". The S-poisoning recovery control flag F5=1 means that the S-poisoning recovery process is being performed.

Subsequently to step 502, the ECU 90 proceeds to step 503 in which the ECU 90 (1) causes exhaust gas to flow through the second passage 40, (2) supplies secondary air into the exhaust gas, and (3) operates the engine by controlling the air-fuel ratio to a slightly rich air-fuel ratio.

More specifically, the ECU 90 first operates the first actuator 51 so as to completely close the first exhaust switching valve 52, and operates the second actuator 53 so as to fully open the second exhaust switching valve 54, thereby causing exhaust gas to flow through the second passage 40. As a result, the temperature fall of exhaust gas occurring until the exhaust gas reaches the NOx catalyst 61 is reduced. Next, the ECU 90 operates the secondary air supplying device 70 to supply secondary air from the secondary air supply pipe 69 into the junction pipe 60 disposed upstream of the NOx catalyst 61. Then, the ECU 90 controls the air-fuel ratio to a slightly rich air-fuel ratio by using a fuel injection control device.

If the engine is operated at a slightly rich air-fuel ratio, exhaust gas having a slightly rich air-fuel ratio and containing a large amount of unburned HC passes through the second passage 40, and flows into the NOx catalyst 61.

The slightly rich exhaust gas containing a large amount of unburned HC and the secondary air supplied from the secondary air supply pipe 69 meet in the junction pipe 60 to form an oxygen-excess exhaust gas containing a large amount of unburned HC, which then flows into the NOx catalyst 61. As a result, oxygen and unburned HC in the exhaust gas undergo oxidizing reaction on the NOx catalyst 61, and heat produced by the reaction increases the catalyst midbed temperature of the NOx catalyst 61. When the catalyst midbed temperature of the NOx catalyst 61 becomes equal to or higher than the SOx release temperature (e.g., 650° C.), SOx absorbed in the NOx catalyst 61 is desorbed from the NOx catalyst 61, and is released in the form of $SO_2$.

Unburned HC that was not oxidized on the NOx catalyst 61 is oxidized on the three-way catalyst 64 disposed downstream of the NOx catalyst 61. Therefore, the degree of the slight richness achieved by control for establishing a slightly rich air-fuel ratio in step 503 is preferably controlled such that unburned HC passing through the NOx catalyst 61 can be substantially removed by the three-way catalyst 64.

Exhaust gas passes through the cold-start catalyst 12 before flowing into the second passage 40. When passing through the cold-start catalyst 12, however, exhaust gas is not supplied with secondary air yet and therefore has a very low oxygen concentration. Thus, the amount of unburned HC oxidized on the cold-start catalyst 12 is very small, and most unburned HC contained in exhaust gas flows into the NOx catalyst 61.

Furthermore, by (1) changing the exhaust gas channel, (2) supplying secondary air, and (3) performing slightly rich control in this order as mentioned above with respect to the processing of step 503, it is possible to prevent emission deterioration at the time of a start of the S-poisoning recovery process.

After executing step 503, the ECU 90 proceeds to step 504 to determine whether the catalyst midbed temperature of the NOx catalyst 61 is equal to or higher than the SOx release temperature, and whether the output value of the downstream-side $O_2$ sensor indicates a fuel-rich atmosphere or not. In this embodiment, the exhaust gas temperature detected by the exhaust temperature sensor 67 is used to represent the catalyst midbed temperature of the NOx catalyst 61.

In order to efficiently desorb SOx from the NOx catalyst 61 and release it in the form of $SO_2$, it is necessary that the catalyst midbed temperature of the NOx catalyst 61 be equal to or higher than the SOx release temperature and that the air-fuel ratio of exhaust gas at the NOx catalyst 61 be slightly rich. If the output value of the downstream-side $O_2$ sensor disposed downstream of the NOx catalyst is on the rich side, it can be determined that a slightly rich atmosphere exists in the casing 62 of the NOx catalyst 61 as well.

Furthermore, it is preferable to control the amount of secondary air to be supplied by controlling the secondary air supplying device 70 so that the air-fuel ratio of exhaust gas flowing into the NOx catalyst 61 becomes equal to such an air-fuel ratio that allows efficient reduction of SOx. It is also possible to control the air-fuel ratio of exhaust gas flowing into the NOx catalyst 61 by maintaining a constant amount of secondary air supplied and controlling the air-fuel ratio of a mixture to be supplied to the engine.

If an affirmative decision (YES) is obtained in step 504, it follows that SOx is being released from the NOx catalyst 61, and the ECU 90 proceeds to step 505. In step 505, the ECU 90 updates the integrated gas amount counter that integrates the amount of exhaust gas during the release of SOx.

Conversely, if a negative decision (NO) is obtained in step 504, the ECU 90 proceeds to step 511 to determine whether the catalyst midbed temperature of the NOx catalyst 61 is lower than a predetermined value T2 and whether the exhaust cooling flag F1 is "1". Since the exhaust cooling flag F1 is "0" in the current cycle, the ECU 90 makes a negative decision (NO) in step 511, and then temporarily ends execution of the routine.

After executing step 505, the ECU 90 proceeds to step 506 to determine whether the count value of the integrated gas amount counter is equal to or greater than a specified value. The specified value is a count value corresponding to an amount of gas that is needed for substantially completely releasing SOx absorbed in the NOx catalyst 61. The specified value is empirically determined and stored in advance in the ROM 92.

If a negative decision (NO) is obtained in step 506, the ECU 90 proceeds to step 511 to determine whether the catalyst midbed temperature of the NOx catalyst 61 is lower than the predetermined value T2 and the exhaust cooling flag F1 is "1". Since the exhaust cooling flag F1 is still "0" at this point of time, the ECU 90 makes a negative decision in step 511, and then temporarily ends execution of the routine.

Conversely, if an affirmative decision (YES) is obtained in step 506, the S-poisoning recovery process of the NOx catalyst 61 is considered as having been completed, and the ECU 90 proceeds to step 507. In step 507, the ECU 90 starts a cooling process for cooling the NOx catalyst 61 by (1) operating the first actuator 51 so as to fully open the first exhaust switching valve 52 and operating the second actuator 53 so as to completely close the second exhaust switching valve 54, thereby causing exhaust gas to flow through the first passage 20, (2) switching air-fuel ratio control performed by the fuel injection control device from the slightly rich control to a feedback stoichiometric control based solely on the output value of the upstream-side $O_2$ sensor 11, (3) setting the exhaust cooling flag F1 to "1", (4) resetting the S-poisoning counter, and (5) resetting the integrated gas amount counter for use in the S-poisoning recovery process.

Immediately after the S-poisoning recovery process of the NOx catalyst 61 is completed, the catalyst midbed temperature of the NOx catalyst 61 is considerably high and within a temperature range in which the NOx removal efficiency is low. If exhaust gas having a lean air-fuel ratio flows through the NOx catalyst 61 in this condition, emission will deteriorate. It is, therefore, desirable to quickly reduce the catalyst midbed temperature of the NOx catalyst 61 after the S-poisoning recovery process is completed. If exhaust gas is caused to flow through the first passage 20, the temperature decrease of the exhaust gas occurring before the exhaust gas reaches the junction pipe 60 increases due to the cooling accelerating effect of the accelerated cooling portion 23, whereby the catalyst midbed temperature of the NOx catalyst 61 can be quickly reduced.

Since the secondary air continues to be supplied into the junction pipe 60, exhaust gas that has been mixed with the secondary air and further cooled flows into the NOx catalyst 61, thus further accelerating the cooling of the NOx catalyst 61.

While the catalyst midbed temperature of the NOx catalyst 61 remains within a high temperature range in which the NOx removal efficiency is low, the exhaust air-fuel ratio is kept at the stoichiometric air-fuel ratio, so that exhaust gas can be purified by the NOx catalyst 61 and the three-way catalyst 64. In this manner, emission deterioration immediately after completion of the S-poisoning recovery process can be prevented.

The reason why the stoichiometric control of the air-fuel ratio in step 507 is the feedback control based solely on the output value of the upstream-side $O_2$ sensor 11 is as follows. For a while after completion of the S-poisoning recovery process, the output value of the downstream-side $O_2$ sensor 68 is on the rich side, and the air-fuel ratio may be falsely corrected toward the lean side if subsidiary feedback control based on the output value of the downstream-side $O_2$ sensor 68 is also performed.

When the ECU 90 executes the next cycle of this routine after setting the exhaust cooling flag F1 to "1" in step 507, the ECU 90 makes a negative decision in step 501, and proceeds to step 508 to set the S-poisoning recovery control flag F5 to "0".

Subsequently, the ECU 90 proceeds to step 509 to determine whether the catalyst midbed temperature of the NOx catalyst 61 is lower than a predetermined temperature T1 and whether the feedback stoichiometric control based on the output value of the upstream-side $O_2$ sensor 11 is being executed. The predetermined temperature T1 is a threshold for determining which of stoichiometric exhaust gas and lean exhaust gas is to be caused to flow.

If an affirmative decision (YES) is obtained in step 509, the ECU 90 proceeds to step 510 to switch the air-fuel ratio control performed by the fuel injection control device from the feedback stoichiometric control based only on the output value of the upstream-side $O_2$ sensor 11 to normal control (i.e., air-fuel ratio control in accordance with the operating state of the engine). After that, the ECU 90 proceeds to step 511.

If a negative decision (NO) is obtained in step 509, the ECU 90 proceeds to step 511. Thus, after the air-fuel ratio control is switched to the feedback stoichiometric control based only on the output value of the upstream-side $O_2$ sensor 11, a negative decision (NO) is obtained in step 509 and the feedback stoichiometric control based only on the output value of the upstream-side $O_2$ sensor 11 is continued until the catalyst midbed temperature of the NOx catalyst 61 becomes lower than the predetermined temperature T1.

In step 511, the ECU 90 determines whether the catalyst midbed temperature of the NOx catalyst 61 is lower than the predetermined temperature T2 and the exhaust cooling flag F1 is "1". The predetermined temperature T2 is set to a value that is smaller than the predetermined temperature T1 (e.g., T1=550° C., and T2=500° C.).

If the catalyst midbed temperature of the NOx catalyst 61 is higher than or equal to the predetermined temperature T2, a negative decision (NO) is obtained in step 511, and the ECU 90 temporarily ends execution of the routine. In this case, therefore, the secondary air continues to be supplied into the junction pipe 60 so as to continue cooling of the NOx catalyst 61.

If the catalyst midbed temperature of the NOx catalyst 61 becomes lower than the predetermined temperature T2, an affirmative decision (YES) is obtained in step 511. Then, the ECU 90 proceeds to step 512 to rewrite the exhaust cooling flag F1 to "0". When the exhaust cooling flag F1 is set to "0", the supply of secondary air into the junction pipe 60 is stopped as described below in conjunction with the secondary air control. In this manner, the NOx catalyst cooling process following completion of the S-poisoning recovery process is finished.

Furthermore, since "0" is stored in the exhaust cooling flag F1 in step 512, a negative decision is obtained in step 400 in the next cycle of the basic control routine of FIG. 5, and the S-poisoning recovery control of step 500 is not executed.

In this embodiment, when an affirmative decision (YES) is obtained in step 506 and the S-poisoning recovery process is completed, the ECU 90 controls the engine air-fuel ratio to be stoichiometric in step 507 while continuing the supply of secondary air to a location upstream of the NOx catalyst 61, and thus causes stoichiometric exhaust gas and secondary air to flow into the NOx catalyst 61 via the first passage 20. However, this process may result in a shift of the air-fuel ratio of exhaust gas flowing into the NOx catalyst 61 toward the fuel-lean side, possibly resulting in a reduction of the NOx removal efficiency when the catalyst midbed temperature of the NOx catalyst 61 is high (e.g., equal to or higher than the predetermined temperature T1 in the illustrated embodiment). To deal with this problem, it is also possible to cool the NOx catalyst 61 while keeping the NOx removal efficiency at a high level, by temporarily stopping the supply of secondary air to the NOx catalyst 61 upon completion of the S-poisoning recovery process, then controlling the engine air-fuel ratio to be substantially stoichiometric, and causing stoichiometric exhaust gas to flow into the NOx catalyst 61 via the first passage 20 while suspending supply of secondary air to the NOx catalyst 61 until the catalyst midbed temperature of the NOx catalyst 61 becomes lower than the predetermined temperature T1. Then, once the catalyst midbed temperature of the NOx catalyst 61 becomes lower than the predetermined temperature T1, secondary air may be supplied to the NOx catalyst 61 to more efficiently cool the NOx catalyst 61. When the catalyst midbed temperature of the NOx catalyst 61 then becomes lower than the predetermined temperature T2, the supply of secondary air may be stopped. In this case, the engine air-fuel ratio control may be changed to lean control upon the re-start of the supply of secondary air, or the stoichiometric control may be continued.

In the foregoing embodiment, after an affirmative decision (YES) is obtained in step 506 and the S-poisoning recovery process is completed, the process of cooling the NOx catalyst 61 is performed by causing stoichiometric exhaust gas to flow until an affirmative decision (YES) is obtained in step 509. However, if exhaust gas having a lean air-fuel ratio is passed through the first passage 20 immediately after completion of the S-poisoning recovery process, and the catalyst midbed temperature of the NOx catalyst 61 can be immediately reduced below the predetermined temperature T2, in other words, if the accelerated cooling portion 23 is designed so as to achieve such a great exhaust cooling effect, the process of cooling the NOx catalyst 61 by passing stoichiometric exhaust gas through the NOx catalyst 61 may be omitted, thus avoiding a reduction in fuel economy that would be otherwise caused by stoichiometric engine operation.

Figure 9:
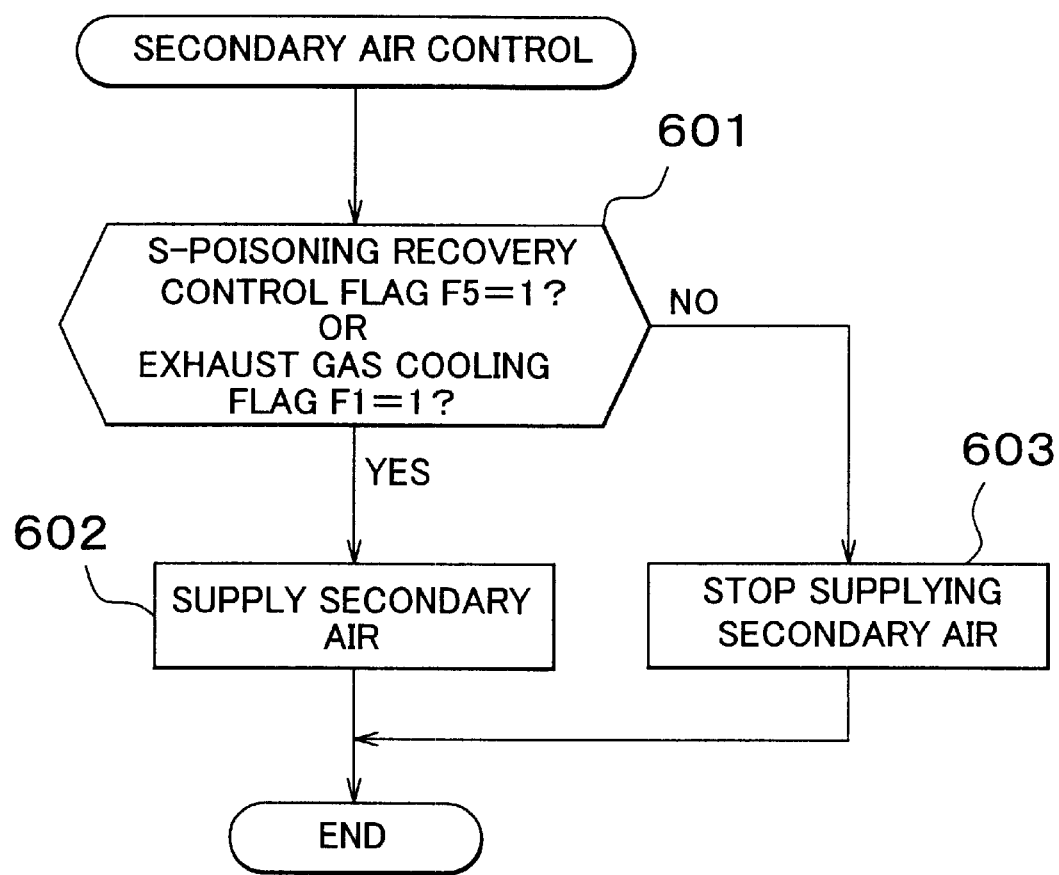
FIG. 9 is a flowchart illustrating a secondary air control routine to be executed in the first embodiment.

Next, the secondary air control of step 600 in the basic control routine in FIG. 5 will be described with reference to a secondary air control routine illustrated in FIG. 9.

First in step 601, the ECU 90 determines whether at least one of the following conditions is satisfied: a condition that the S-poisoning recovery control flag F5 is "1", and a condition that the exhaust cooling flag F1 is "1".

If the S-poisoning recovery control flag F5 is "1", or if the exhaust cooling flag F1 is "1", the ECU 90 makes an affirmative decision (YES) in step 601, and proceeds to step 602. In step 602, the ECU 90 operates the secondary air supplying device 70 to supply secondary air from the secondary air supply pipe 69 to the junction pipe 60.

If the S-poisoning recovery control flag F5 is "0" and the exhaust cooling flag F1 is "0", the ECU 90 makes a negative decision (NO) in step 601, and proceeds to step 603. In step 603, the ECU 90 stops the operation of the secondary air supplying device 70, thereby stopping the supply of secondary air from the secondary air supply pipe 69 to the junction pipe 60.

Therefore, if the ECU 90 makes an affirmative decision in step 400 and proceeds to the S-poisoning recovery control of step 500 in the basic control routine, the secondary air continues to be supplied to the junction pipe 60 until the exhaust cooling flag F1 is rewritten into "0" in step 512 in the S-poisoning recovery control routine.

Next, an exhaust purifying apparatus for an internal combustion engine according to a second embodiment of the invention will be described with reference to FIGS. 12 to 15. The exhaust purifying apparatus of the second embodiment is made even more compact or smaller in size than that of the first embodiment.

Figure 12:
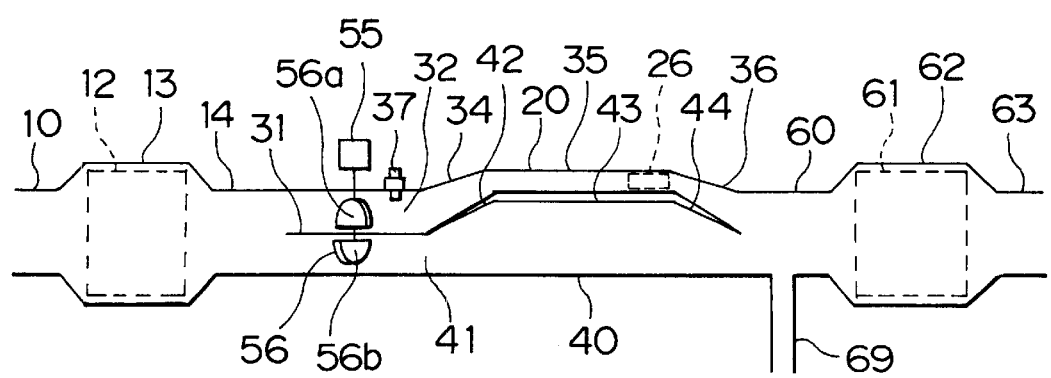
FIG. 12 is a diagram illustrating the construction of a principal portion of a second embodiment of the invention in the form of an exhaust purifying apparatus for an internal combustion engine.
Figure 13:
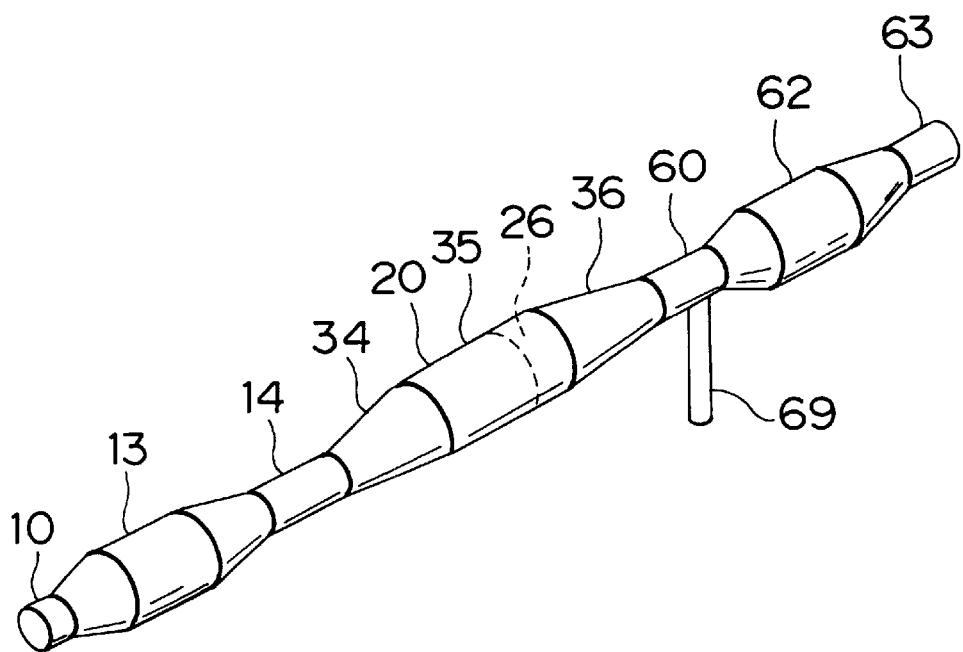
FIG. 13 is a perspective view of the principal portion of the exhaust purifying apparatus of the second embodiment.

As shown in FIGS. 12 and 13, in the second embodiment, a part of the interior of an exhaust pipe 14 disposed downstream of a casing 13 that houses a cold-start catalyst 12 is divided by a partition 31 into upper and lower passages 32, 41 each having a generally semicircular cross-sectional shape.

A portion of the exhaust pipe 14 located above the partition 31 (i.e., the passage 32) is connected to an accelerated cooling portion 35 having a generally arcuate cross-sectional shape via a sectional shape changing portion 34. The accelerated cooling portion 35 is connected to an upper half portion of a junction pipe 60 via a sectional shape changing portion 36. The junction pipe 60 has a cylindrical shape, and is connected to a casing 62 that houses a NOx catalyst 61 as in the first embodiment. A secondary air supply pipe 69 is connected to the junction pipe 60. The cross-sectional shape of the sectional shape changing portion 34 gradually changes from the upper half portion of the exhaust pipe 14 for smooth connection with the accelerated cooling portion 35 having an arcuate cross-sectional shape. The cross-sectional shape of the sectional shape changing portion 36 gradually changes from the accelerated cooling portion 35 having an arcuate cross-sectional shape for smooth connection with the upper half portion of the junction pipe 60.

A portion of the exhaust pipe 14 located below the partition 31 (i.e., the passage 41) is connected to a tubular portion 43 having a cylindrical shape via a sectional shape changing portion 42. The tubular portion 43 is connected to a lower half portion of the junction pipe 60 via a sectional shape changing portion 44. The cross-sectional shape of the sectional shape changing portion 42 gradually changes from the lower half portion of the exhaust pipe 14 for smooth connection with the tubular portion 43 having a cylindrical shape. The cross-sectional shape of the sectional shape changing portion 44 gradually changes from the tubular portion 43 for smooth connection with the lower half portion of the junction pipe 60.

Figure 15:
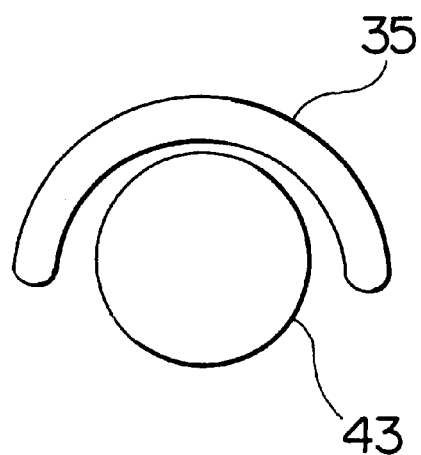
FIG. 15 is a cross-sectional view of a first passage and a second passage in the second embodiment.

The accelerated cooling portion 35 is positioned relative to the tubular portion 43 so as to surround the tubular portion 43, as shown in FIG. 15.

Figure 14:
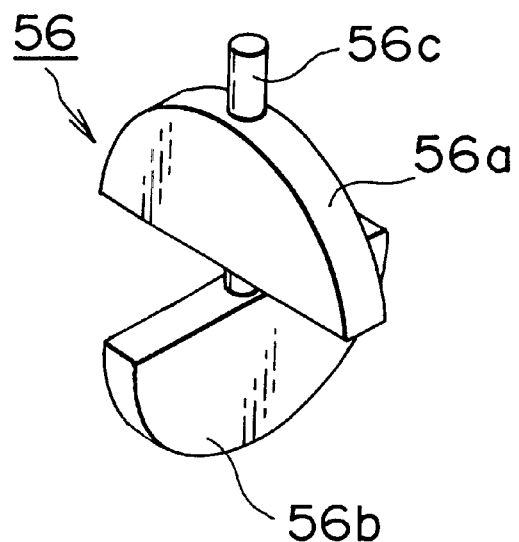
FIG. 14 is a schematic perspective view of an exhaust switching valve used in the second embodiment.

An exhaust switching valve 56 is disposed in the passages 32, 41 of the exhaust pipe 14 such that the switching valve 56 is selectively opened and closed by an actuator 55. In the exhaust switching valve 56, as shown in FIG. 14, a valve body 56a for opening and closing the passage 32 and a valve body 56b for opening and closing the passage 41 are connected to a single valve shaft 56c that is rotatably mounted to extend through the partition 31, in such a fashion that the plane of the valve body 56a and the plane of the valve body 56b form right angles. The valve shaft 56c is rotated by the actuator 55. Thus, when the valve body 56a of the exhaust switching valve 56 is positioned so as to completely close the passage 32, the valve body 56b is positioned so as to fully open the passage 41. When the valve body 56a is positioned so as to fully open the passage 32, the valve body 56b is positioned so as to completely close the passage 41.

Furthermore, in the second embodiment, an HC adsorbent 26 is located in a downstream end portion of the accelerated cooling portion 35.

In the second embodiment, the passage 32 of the exhaust pipe 14, the sectional shape changing portion 34, the accelerated cooling portion 35 and the sectional shape changing portion 36 constitute a first passage 20. Also, the passage 41 of the exhaust pipe 14, the sectional shape changing portion 42, the tubular portion 43 and the sectional shape changing portion 44 constitute a second passage 40. Furthermore, in the second embodiment, the exhaust switching valve 56 forms a flow amount control system that controls the amount of exhaust gas flow in the first passage 20 and the amount of exhaust gas flow in the second passage 40. Other structures are substantially the same as those of the first embodiment, and will not be described herein.

In the second embodiment in which the first passage 20 includes the accelerated cooling portion 35, when exhaust gas at the same temperature is caused to flow through the first passage 20 or the second passage 40 at the same flow rate, the temperature of the exhaust gas decreases by a larger degree when the exhaust gas flows through the first passage 20 than when it flows through the second passage 40. Therefore, by selectively using the first passage 20 and the second passage 40, the catalyst midbed temperature of the NOx catalyst 61 can be kept within a high-NOx removal temperature range and heat deterioration of the NOx catalyst 61 can be retarded or suppressed, as in the first embodiment.

Furthermore, in the second embodiment, the accelerated cooling portion 35 is disposed in such a manner as to surround the tubular portion 43, and the flow amount control unit is constituted by the single exhaust switching valve 56, while the HC adsorbent 26 is housed in the accelerated cooling portion 35. Therefore, the exhaust purifying apparatus of this embodiment can be made more compact or smaller in size than that of the first embodiment.

In the first embodiment, the exhaust gas temperature is used to represent the catalyst midbed temperature of the NOx catalyst 61, and the exhaust temperature sensor 67 for detecting the temperature of exhaust gas is disposed downstream of the NOx catalyst 61. However, it is also possible to dispose the exhaust temperature sensor 67 upstream of the NOx catalyst 61. Furthermore, it is possible to provide a catalyst temperature sensor in the casing 62 and use this temperature sensor to directly detect the catalyst midbed temperature of the NOx catalyst 61.

In the illustrated first embodiment, the channel through which the exhaust gas flows is switched between the first passage 20 and the second passage 40, depending upon the exhaust gas temperature detected by the exhaust temperature sensor 67. It is, however, to be understood that the exhaust gas temperature sensor or a catalyst temperature sensor for detecting the catalyst midbed temperature of the NOx catalyst 61 is not an essential constituent element of the invention.

For example, the channel selection may be accomplished as follows. Assuming all possibilities of the engine operating state (the engine speed, engine load, and the air-fuel ratio), the catalyst midbed temperatures of the NOx catalyst 61 when the entire amount of exhaust gas flows through the first passage 20 and when the entire amount of exhaust gas flows through the second passage 40 are empirically determined in advance. Based on the results of experiments, one of the channels that achieves higher NOx removal efficiency is determined in accordance with the current engine operating state. A map of correspondence between the engine operating states and the exhaust passages (the first passage 20 and the second passage 40) is prepared and stored in the ROM 92. With reference to this map, the ECU 90 controls the exhaust switching valves 52, 54.

In the first embodiment, the first and second exhaust switching valves 52, 54 are controlled so that exhaust gas flows through one of the first passage 20 and the second passage 40. With the valves 52, 54 controlled in this manner, however, the temperature of exhaust gas flowing into the NOx catalyst 61 may be rapidly or sharply changed, which may greatly affect the resulting emissions. In order to prevent such rapid changes in the catalyst midbed temperature of the NOx catalyst 61 and perform accurate catalyst temperature control, the first and second exhaust switching valves 52, 54 may be constructed as being able to control the flow amount therethrough, and are controlled in the following manner. Within a temperature range for switching of the exhaust channel, the first and second exhaust switching valves 52, 54 are controlled so as to control the ratio of the amount of flow through the first passage 20 to that of flow through the second passage 40, so that the exhaust gas is caused to flow through both the first passage 20 and the second passage 40 at a suitable flow amount ratio.

The above-indicated temperature range for switching of the exhaust channel corresponds to a temperature range that is higher than a threshold α for switching from the first passage 20 to the second passage 40 and is lower than a threshold β for switching from the second passage 40 to the first passage 20 in the first embodiment. An example of a method for setting a flow amount ratio between the first passage 20 and the second passage 40 includes empirically determining optimal flow amount ratios for achieving higher NOx removal efficiencies with respect to different temperatures within the exhaust channel switching temperature range, and mapping and storing those ratios in advance in the ROM 92. The ECU 90 then selects a suitable flow amount ratio referring to the map, depending upon the exhaust gas temperature detected by the exhaust temperature sensor 67.

Furthermore, where a system is designed such that the exhaust gas channel is switched based on the operating state of the engine, the catalyst midbed temperatures of the NOx catalyst 61 may be measured when the entire amount of exhaust gas flows through the first passage 20 and when the entire amount of exhaust gas flows through the second passage 40, assuming all possibilities of the engine operating state (engine speed, engine load and air-fuel ratio), and may be mapped and stored in the ROM 92. With this system, the catalyst midbed temperature of the NOx catalyst 61 corresponding to each flow amount ratio between the first passage 20 and the second passage 40 may be estimated by performing interpolation on the map stored in the ROM 92, thus permitting the ECU 90 to select a flow amount ratio that provides an optimal catalyst midbed temperature most suitable for NOx removal or exhaust purification.

In the first embodiment, the catalyst whose midbed temperature is to be controlled by switching channels, that is, the catalyst housed in the casing 62, is the occlusion-reduction type NOx catalyst 61. However, the catalyst housed in the casing 62 may also be a selective reduction type NOx catalyst 57 (see FIG. 16) that is a kind of lean-burn NOx catalyst.

Figure 16:
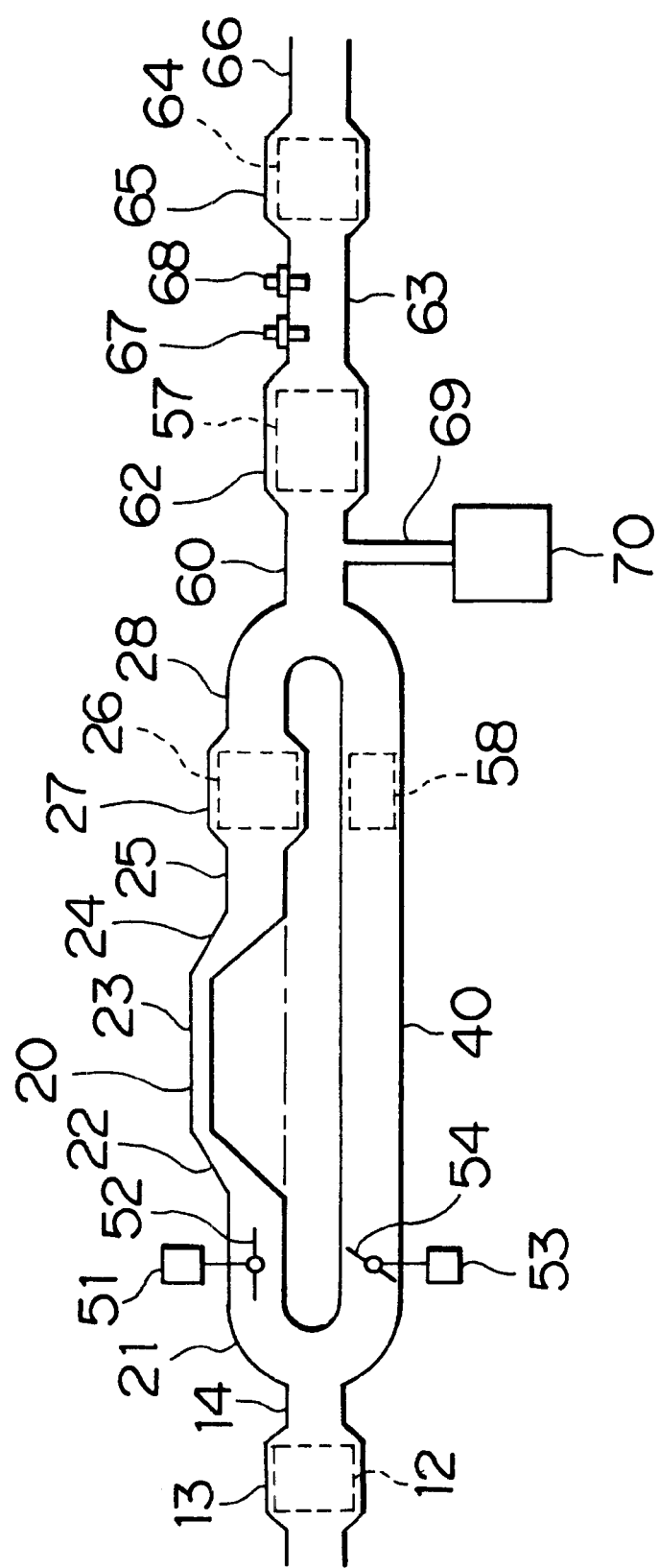
FIG. 16 is a diagram illustrating the construction of a principal portion of another embodiment of the engine exhaust purifying apparatus of the invention.

The high-NOx removal temperature range of a selective reduction type NOx catalyst is at a higher temperature side, compared to the high-NOx removal temperature range of an occlusion-reduction type NOx catalyst. Therefore, in the case where a selective reduction type NOx catalyst is employed, it is preferable to increase the NOx removal efficiency at low exhaust gas temperatures by providing an occlusion-reduction type NOx catalyst 58 in the second passage 40 through which relatively low-temperature exhaust gas flows, as shown in FIG. 16. This arrangement makes it possible to reduce the load or burden imposed on the selective reduction type NOx catalyst 57, that is, the NOx concentration in exhaust gas flowing into the selective reduction type NOx catalyst 57, when exhaust gas flows through the second passage 40.

Furthermore, in the exhaust purifying apparatus as shown in FIG. 16, a basic channel switching control is substantially the same as that of the first embodiment, and exhaust gas is caused to flow through the first passage 20 during high-load engine operation in which the exhaust gas temperature becomes high. During this operation, HC adsorbed on the HC adsorbent 26 is desorbed from the adsorbent 26, and flows along with exhaust gas into the selective reduction type NOx catalyst 57, to serve as a reducing agent for NOx removal. Accordingly, the NOx removal efficiency is improved during high-load engine operation, for example, during high-speed vehicle running.

Figure 17:
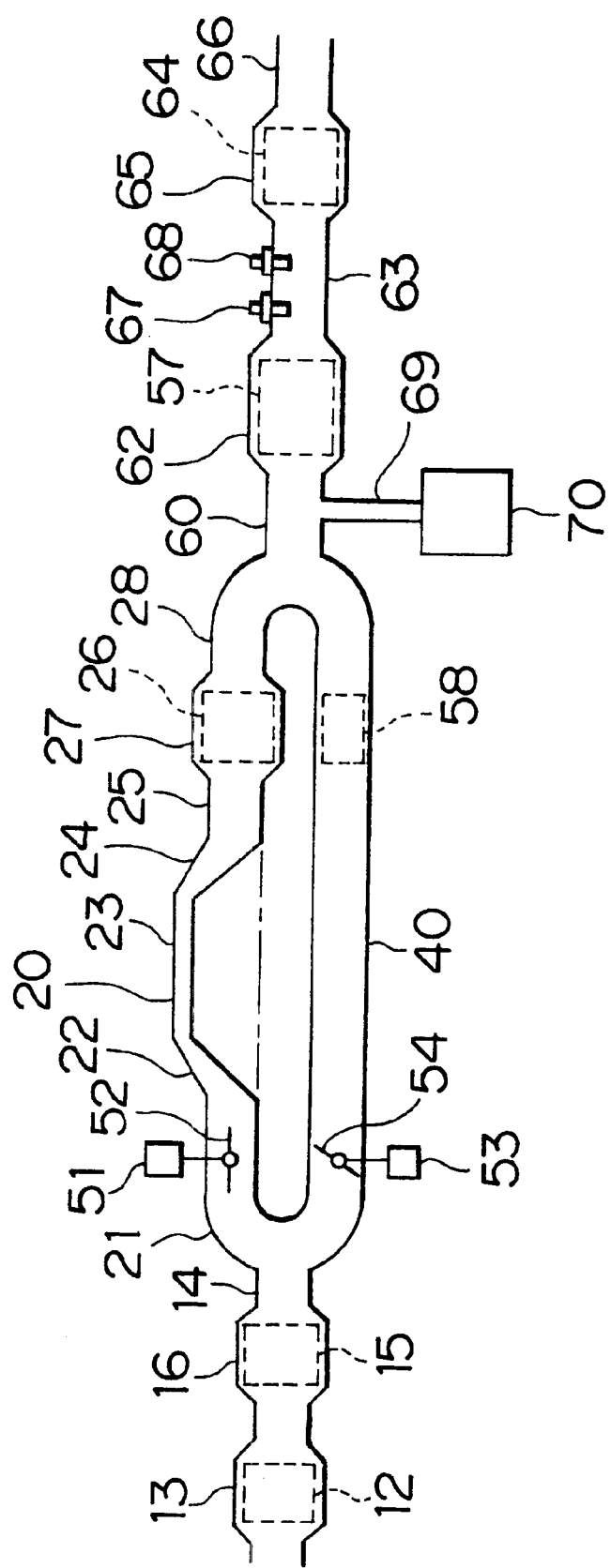
FIG. 17 is a diagram illustrating a principal portion of still another embodiment of the engine exhaust purifying apparatus of the invention.

Furthermore, as shown in FIG. 17, a casing 16 that houses a selective reduction type NOx catalyst 15 may also be provided between the exhaust pipe 14 and the casing 13 that houses the cold-start catalyst 12. With this arrangement, NOx can be removed at a high removal efficiency by the selective reduction type NOx catalyst 15 when high-temperature exhaust gas is discharged from the engine during high-load engine operation, for example, during high-speed vehicle running. Furthermore, the load or burden on the downstream-side selective reduction type NOx catalyst 57 can be reduced. In this construction, the casing 16 forms a common passage upstream of the first passage 20 and the second passage 40.

In the exhaust purifying apparatus of the first embodiment, it is possible to determine whether the first and second exhaust switching valves 52, 54 are normally operating, based on the magnitude of a change in the exhaust gas temperature detected by the exhaust temperature sensor 67 when the exhaust gas channel in operation is changed by the opening/closing control of the first and second exhaust switching valves 52, 54. This is because when the first and second exhaust switching valves 52, 54 are normally operating, the magnitude of a change in the temperature of the NOx catalyst 61 that occurs upon switching of the exhaust gas channel is substantially determined in accordance with the engine operating state.

Here, a relationship between the engine operating state and the magnitude of the temperature change upon switching of the channel during normal operations of the first and second exhaust switching valves 52, 54 is empirically obtained. A map of reference temperature differences is prepared based on the thus obtained relationship, taking account of allowable errors, and the map thus prepared is stored in the ROM 92. It is thus possible to determine whether the first and second exhaust switching valves 52, 54 are normally operating, by comparing the magnitude of a temperature change calculated based on exhaust gas temperatures detected by the exhaust temperature sensor 67 before and after switching of the channel, with a reference temperature difference read from the map in accordance with the engine operating state.

The determination as to normality/abnormality of the operation of the exhaust switching valve(s) may also be carried out with the exhaust purifying apparatus of the second embodiment.

Furthermore, the operation normality/abnormality determination regarding the exhaust switching valves may also be accomplished based on a pressure change occurring upon switching of the channel, as well as the magnitude of a temperature change upon switching of the channel as mentioned above. This modification will be described in conjunction with the exhaust purifying apparatus of the second embodiment.

In the exhaust purifying apparatus of the second embodiment shown in FIG. 12, the pressure in the pipe upstream of the HC adsorbent 26 is higher when the passage 32 is opened by the valve body 56a than when the passage 32 is closed by the valve body 56a. The magnitude of a pressure change that occurs when the valve body 56a is switched from the open state to the closed state or, conversely, when the valve body 56a is switched from the closed state to the open state, may be substantially determined in advance in accordance with the engine operating state.

For example, a pressure sensor (pressure detector) 37 for detecting the in-pipe pressure between the valve body 56a and the HC adsorbent 26 is provided in the exhaust pipe 14. A relationship between engine operating states and pressure changes occurring upon switching of the channel when the exhaust switching valve 56 normally operates are empirically determined beforehand. A map of reference ranges of pressure change is prepared based on the relationship, taking account of allowable errors, and is stored in the ROM 92. It is thus possible to determine whether the exhaust switching valve 56 is normally operating, by comparing the magnitude of a pressure change calculated based on the levels of pressure detected by the pressure sensor 37 before and after switching of the channel, and a reference range of pressure change read from the map in accordance with the current engine operating state,.

Although the exhaust switching valve 56 is provided upstream of the HC adsorbent 26 in the second embodiment as shown in FIG. 12, the exhaust switching valve 56 may also be disposed, together with the partition 31, in the junction pipe 60 downstream of the HC adsorbent 26. In this case, too, a pressure sensor may be provided in a section between the HC adsorbent 26 and the valve body 56a of the exhaust switching valve 56, so that whether the exhaust switching valve 56 is normally operating or not can be determined based on the change between the pressure levels detected by the pressure sensor before and after the exhaust switching.

The normality/abnormality determination regarding the exhaust switching valve based on the pressure change may also be implemented in the exhaust purifying apparatus of the first embodiment.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An exhaust purifying apparatus for an internal combustion engine, the exhaust purifying apparatus comprising:
    a catalyst that purifies exhaust gas emitted from the internal combustion engine;
    a first passage disposed between the engine and the catalyst to allow exhaust gas to flow therethrough from the engine to the catalyst, said first passage including an accelerated cooling portion having an outer cross-section that permits a first quantity of heat to be released from the exhaust gas in the first passage, the accelerated cooling portion having an outer cross-sectional shape that is different from an outer cross-sectional shape of a remainder of the first passage;
    a second passage disposed between the engine and the catalyst to allow exhaust gas to flow therethrough from the engine to the catalyst, said second passage having an outer cross-section that permits a second quantity of heat that is smaller than said first quantity of heat to be released from the exhaust gas in the second passage; and
    a flow amount controller that controls amounts of exhaust gas flowing through the first passage and through the second passage, such that: (i) the amount of exhaust gas flowing through the first passage is made larger than the amount of exhaust gas flowing through the second passage when a temperature of exhaust gas emitted from the engine is to be lowered by a relatively large degree before the exhaust gas flows into the catalyst, and (ii) the amount of exhaust gas flowing through the second passage is made larger than the amount of exhaust gas flowing through the first passage when the temperature of exhaust gas emitted from the engine is to be lowered by a relatively small degree before the exhaust gas flows into the catalyst.

2. An exhaust purifying apparatus according to claim 1, wherein the outer cross-section of the accelerated cooling portion of the first passage is generally arcuate, and the outer cross-section of the second passage is generally circular.

3. An exhaust purifying apparatus according to claim 2, wherein the accelerated cooling portion of the first passage substantially surrounds the second passage.

4. An exhaust purifying apparatus according to claim 1, wherein the first passage and the second passage have substantially equal lengths.

5. An exhaust purifying apparatus according to claim 1, wherein the first passage and the second passage have outer cross-sectional areas that are substantially equal.

6. An exhaust purifying apparatus according to claim 1, wherein the catalyst comprises a lean NOx catalyst capable of purifying exhaust gas with a lean air-fuel ratio of NOx.

7. An exhaust purifying apparatus according to claim 1, wherein the flow amount controller controls the amounts of exhaust gas flowing through the first passage and through the second passage, based on a catalyst midbed temperature of the catalyst or a parameter effecting the catalyst midbed temperature.

8. An exhaust purifying apparatus according to claim 7, wherein the flow amount controller controls the amounts of exhaust gas flowing through the first passage and through the second passage so as to control a catalyst midbed temperature of the catalyst to be within a predetermined temperature range in which the catalyst provides a purification efficiency of not lower than a specified value.

9. An exhaust purifying apparatus according to claim 1, wherein the flow amount controller controls the amount of exhaust gas flowing through the second passage to be larger than the amount of exhaust gas flowing through the first passage during an S-poisoning recovery process for releasing SOx that has been absorbed by the catalyst.

10. An exhaust purifying apparatus according to claim 9, further comprising an exhaust air-fuel controller that controls an air-fuel ratio of exhaust gas that flows into the catalyst during the S-poisoning recovery process to be substantially equal to or richer than a stoichiometric air-fuel ratio.

11. An exhaust purifying apparatus according to claim 9, wherein the flow amount controller controls the amounts of flow so as to increase a proportion of the exhaust gas flowing through the first passage immediately after completion of the S-poisoning recovery process.

12. An exhaust purifying apparatus according to claim 1, further comprising an HC adsorbent provided in the first passage, wherein the flow amount controller causes all the exhaust gas to flow through the first passage during a start of the internal combustion engine.

13. An exhaust purifying apparatus according to claim 12, wherein the HC adsorbent is disposed downstream of the accelerated cooling portion of the first passage.

14. An exhaust purifying apparatus according to claim 12, wherein the catalyst comprises a selective reduction type NOx catalyst that reduces or decomposes NOx in the presence of hydrocarbon in an oxygen-excess atmosphere, said second passage being provided with an occlusion-reduction type NOx catalyst that absorbs NOx when incoming exhaust gas has a lean air-fuel ratio, and releases and reduces the absorbed NOx into $N_2$ when the concentration of oxygen contained in the incoming exhaust gas is reduced, said flow amount controller causes exhaust gas to flow mainly through the first passage when the engine is operating with a high load.

15. An exhaust purifying apparatus according to claim 14, further comprising a common passage located upstream of the first passage and the second passage, said common passage allowing exhaust gas to flow therethrough before entering the first and second passages, said common passage being provided with an additional selective reduction type NOx catalyst that reduces or decomposes NOx in the presence of hydrocarbon in an oxygen-excess atmosphere.

16. An exhaust purifying apparatus according to claim 1, further comprising:
a temperature sensor disposed at one of: (i) a joint passage into which a downstream portion of the first passage and a downstream portion of the second passage merge, (ii) an exhaust passage disposed downstream of the joint passage, and (iii) the catalyst; and
a diagnostic unit that determines whether the flow amount controller operates normally or not, based on a change in the temperature detected by the temperature sensor when the flow amount controller is operated to change a ratio of the amounts of exhaust gas flowing through the first passage and through the second passage.

17. An exhaust purifying apparatus according to claim 1, further comprising:
a pressure sensor disposed in the first passage to detect a pressure of exhaust gas; and
a diagnostic unit that determines whether the flow amount controller operates normally or not, based on a change in the pressure detected by the pressure sensor when the flow amount controller is operated to change a ratio of the amounts of exhaust gas flowing through the first passage and through the second passage.

18. A method of purifying exhaust emitted from an internal combustion engine by utilizing a catalyst that purifies exhaust gas emitted from the internal combustion engine, the method comprising:
disposing a first passage between the engine and the catalyst to allow exhaust gas to flow through the first passage from the engine to the catalyst, the first passage including an accelerated cooling portion having an outer cross-section that permits a first quantity of heat to be released from the exhaust gas in the first passage, the accelerated cooling portion having an outer cross-sectional shape that is different from an outer cross-sectional shape of a remainder of the first passage;
disposing a second passage between the engine and the catalyst to allow exhaust gas to flow through the second passage from the engine to the catalyst, the second passage having an outer cross-section that permits a second quantity of heat that is smaller than the first quantity of heat to be released from the exhaust gas in the second passage; and
controlling amounts of exhaust gas flowing through the first passage and through the second passage, including: (i) making the amount of exhaust gas flowing through the first passage larger than the amount of exhaust gas flowing through the second passage when a temperature of exhaust gas emitted from the engine is to be lowered by a relatively large degree before the exhaust gas flows into the catalyst, and (ii) making the amount of exhaust gas flowing through the second passage larger than the amount of exhaust gas flowing through the first passage when the temperature of exhaust gas emitted from the engine is to be lowered by a relatively small degree before the exhaust gas flows into the catalyst.

19. A method according to claim 18, further comprising making the outer cross-section of the accelerated cooling portion of the first passage generally arcuate, and making the outer cross-section of the second passage generally circular.

20. A method according to claim 19, wherein the accelerated cooling portion of the first passage is disposed to substantially surround the second passage.

21. A method according to claim 18, further comprising making a length of the first passage substantially equal to a length of the second passage.

22. A method according to claim 18, further comprising making cross-sectional areas of the first passage and of the second passage substantially equal.

23. A method according to claim 18, wherein the amounts of exhaust gas flowing through the first passage and through the second passage are controlled based on a catalyst midbed temperature of the catalyst or a parameter effecting the catalyst midbed temperature.

24. A method according to claim 23, wherein the amounts of exhaust gas flowing through the first passage and through the second passage are controlled so as to control a catalyst midbed temperature of the catalyst to be within a predetermined temperature range in which the catalyst provides a purification efficiency of not lower than a specified value.

25. A method according to claim 18, wherein the amount of exhaust gas flowing through the second passage is controlled to be larger than the amount of exhaust gas flowing through the first passage during an S-poisoning recovery process for releasing SOx that has been absorbed by the catalyst.

26. A method according to claim 25, further comprising controlling an air-fuel ratio of exhaust gas that flows into the catalyst during the S-poisoning recovery process to be substantially equal to or richer than a stoichiometric air-fuel ratio.

27. A method according to claim 25, wherein the amounts of flow are controlled so as to increase a proportion of the exhaust gas flowing through the first passage immediately after completion of the S-poisoning recovery process.

28. A method according to claim 18, wherein an HC adsorbent is provided in the first passage, and wherein all the exhaust gas is controlled to flow through the first passage during a start of the internal combustion engine.

29. A method according to claim 28, wherein:
the catalyst comprises a selective reduction type NOx catalyst that reduces or decomposes NOx in the presence of hydrocarbon in an oxygen-excess atmosphere;

the second passage is provided with an occlusion-reduction type NOx catalyst that absorbs NOx when incoming exhaust gas has a lean air-fuel ratio, and releases and reduces the absorbed NOx into $N_2$ when the concentration of oxygen contained in the incoming exhaust gas is reduced; and the controlling step causes exhaust gas to flow mainly through the first passage when the engine is operating with a high load.

30. A method according to claim 18, further comprising:

sensing a temperature at one of: (i) a joint passage into which a downstream portion of the first passage and a downstream portion of the second passage merge, (ii) an exhaust passage disposed downstream of the joint passage, and (iii) the catalyst; and determining whether the flow amount controlling step is being performed normally or not, based on a change in the sensed temperature when the controlling step changes a ratio of the amounts of exhaust gas flowing through the first passage and through the second passage.

31. A method according to claim 18, further comprising:

detecting a pressure of exhaust gas in the fist passage; and determining whether the flow amount controlling step is being performed normally or not, based on a change in the detected pressure when the controlling step changes a ratio of the amounts of exhaust flowing through the first passage and the second passage.

* * * * *